US011247746B2

(12) United States Patent
Meehan et al.

(10) Patent No.: US 11,247,746 B2
(45) Date of Patent: Feb. 15, 2022

(54) ELECTRIC CONVENIENCE VEHICLE (ECV) WITH CONTROL AND COMMUNICATIONS UNIT

(71) Applicant: ScooterBug, Inc., Orlando, FL (US)

(72) Inventors: Christopher T. Meehan, Palm Coast, FL (US); Marc M. Barber, Deltona, FL (US); Kurt D. Ring, Andover, MA (US); Colt Wright Fletcher, Orlando, FL (US); John Thomas Zaniker, Severna Park, MD (US); Tomas Rodriguez, Winter Park, FL (US); Wesley Edward Swogger, Fairfax Station, VA (US); Hal Gunner, Lake Mary, FL (US)

(73) Assignee: ScooterBug, Inc., Orlando, FL (US)

( * ) Notice: Subject to any disclaimer, the term of this patent is extended or adjusted under 35 U.S.C. 154(b) by 284 days.

(21) Appl. No.: 15/998,677

(22) Filed: Aug. 16, 2018

(65) Prior Publication Data

US 2019/0054972 A1 Feb. 21, 2019

Related U.S. Application Data

(63) Continuation-in-part of application No. 15/680,054, filed on Aug. 17, 2017, now abandoned.
(Continued)

(51) Int. Cl.
*B60W 30/16* (2020.01)
*A61G 5/04* (2013.01)
(Continued)

(52) U.S. Cl.
CPC ............... *B62K 5/01* (2013.01); *B62J 99/00* (2013.01); *B62K 21/00* (2013.01); *B62K 23/00* (2013.01);
(Continued)

(58) Field of Classification Search
CPC ... G05D 1/02; B60L 7/10; B60L 5/00; B60W 30/12; B60W 30/16; B60R 25/23;
(Continued)

(56) References Cited

U.S. PATENT DOCUMENTS 5,497,056 A * 3/1996 Kurland .................... B60L 7/10
180/907
6,050,593 A 4/2000 McConnell et al.
(Continued)

FOREIGN PATENT DOCUMENTS

CN 203042683 U * 7/2013 ............... A61G 5/04
CN 203042683 U 7/2013
(Continued)

OTHER PUBLICATIONS

International Search Report and Written Opinion corresponding to related PCT Application No. PCT/US2018/000153, dated Jan. 2, 2019, 10 pages.
(Continued)

*Primary Examiner* — Yuri Kan
(74) *Attorney, Agent, or Firm* — Foley & Lardner LLP

(57) ABSTRACT

One embodiment of an electric convenience vehicle (ECV) may include a frame, a plurality of wheels configured to support and move the frame, a user support member supported by the frame, a steering mechanism disposed toward a front portion of the ECV, a motor configured to cause at least one wheel to be propelled forward, propelled backward, or to remain in a fixed position, a throttle, when activated in a first position, may cause the motor to propel the wheel(s) in a forward direction, when activated in a second position, may cause the motor to propel the wheel(s) in a reverse direction, and a control and communications unit (CCU) disposed in front of the user support member, and configured to control operations of the motor.

39 Claims, 39 Drawing Sheets

Related U.S. Application Data

(60) Provisional application No. 62/546,474, filed on Aug. 16, 2017.

(51) Int. Cl.

| | | |
|---|---|---|
| *G05D 1/02* | (2020.01) | |
| *B60L 7/10* | (2006.01) | |
| *B62K 5/01* | (2013.01) | |
| *B62K 23/00* | (2006.01) | |
| *B62J 99/00* | (2020.01) | |
| *B62K 21/00* | (2006.01) | |
| *G06Q 30/06* | (2012.01) | |
| *G07F 17/00* | (2006.01) | |
| *G06Q 20/12* | (2012.01) | |
| *B62J 45/20* | (2020.01) | |
| *B62J 45/40* | (2020.01) | |
| *B62J 50/20* | (2020.01) | |

(52) U.S. Cl.
CPC ....... *G06Q 20/127* (2013.01); *G06Q 30/0645* (2013.01); *G07F 17/0057* (2013.01); *B62J 45/20* (2020.02); *B62J 45/40* (2020.02); *B62J 50/20* (2020.02); *G06Q 20/12* (2013.01)

(58) Field of Classification Search
CPC .... B25J 5/00; A61G 5/04; G07C 5/00; G06K 9/00798
See application file for complete search history.

(56) References Cited

U.S. PATENT DOCUMENTS

| | | | |
|---|---|---|---|
| D457,466 S | 5/2002 | Cheng | |
| D511,720 S | 11/2005 | Chen | |
| 7,243,746 B1 | 7/2007 | Vasant | |
| D576,920 S | 9/2008 | Yang | |
| 7,762,231 B2 | 7/2010 | Dugas et al. | |
| 9,418,345 B1 | 8/2016 | Meehan et al. | |
| 2011/0295452 A1 | 12/2011 | Meyers | |
| 2013/0317693 A1* | 11/2013 | Jefferies | G07B 15/00 701/31.5 |
| 2015/0291163 A1* | 10/2015 | Kim | B60W 30/12 701/96 |
| 2015/0348416 A1 | 12/2015 | Fujita et al. | |
| 2016/0014252 A1 | 1/2016 | Biderman et al. | |
| 2016/0075177 A1 | 3/2016 | Biderman et al. | |
| 2017/0098273 A1 | 4/2017 | Meehan et al. | |
| 2017/0356994 A1* | 12/2017 | Wodrich | B60Q 9/006 |
| 2018/0056985 A1 | 3/2018 | Coulter et al. | |
| 2018/0101179 A1 | 4/2018 | Louey et al. | |
| 2019/0039564 A1* | 2/2019 | Nishikawa | B60R 25/23 |
| 2019/0056745 A1* | 2/2019 | Meehan | B62J 1/12 |

FOREIGN PATENT DOCUMENTS

| | | | | |
|---|---|---|---|---|
| CN | 205113582 U | | 3/2016 | |
| CN | 107233168 A | * | 10/2017 | ............... A61G 5/04 |
| CN | 107233168 A | | 10/2017 | |
| JP | 2004185425 A | * | 7/2004 | ......... G06K 9/00798 |
| JP | 2010115434 A | | 11/2008 | |
| JP | 2014121190 A | * | 6/2014 | ............... B60L 5/00 |
| JP | 2014121190 A | | 6/2014 | |
| KR | 20140128086 A | | 11/2014 | |
| KR | 20140128086 A | * | 11/2014 | ............... B25J 5/00 |
| KR | 20150077729 A | | 7/2015 | |
| WO | 2011081617 A1 | | 7/2011 | |
| WO | WO-2019/032566 A1 | | 2/2019 | |

OTHER PUBLICATIONS

Drive Medical OdysseyGT 18CS /Drive Medical 4 Wheel Scooter / Scooter Direct; https://www.scooterdirect.com/drive-medical-odyssey-gt.html, Dec. 2017, 2 pages.

Povaiah, Roshun, "Flow—22 Motors' Elecliic Scooter is Futuristic Yet Simple", https://www.thequint.com/tech-and-auto/22-motors-flow-electric-smart-scooter-unveiled, Feb. 11, 2017, 8 pages.

Going Green S.L. "The first electric scooter with the 3G technology", http://thecorebike.com/en/technology/, Apr. 4, 2017, 3 pages.

Merits Eclipse S2 /Merits Scooters—Medium/ ScooterWorld, http://www.scooter-world.com/au/product-category/scooters-medium/merits eclipse s2, 2015, 4 pages.

Merits Silverado Scooter / Merits 4 Wheel Scooter / Scooter Direct; https://www.scooterdirct.com/meritsr-wheel-full-suspension-scooter.html, Dec. 6, 2017, 1 page.

Quingo toura 2, https://www.quingoscooters.com/quingo-toura-mobility-scooter/, Copyright 2016 AMC Ltd, 6 pages.

* cited by examiner

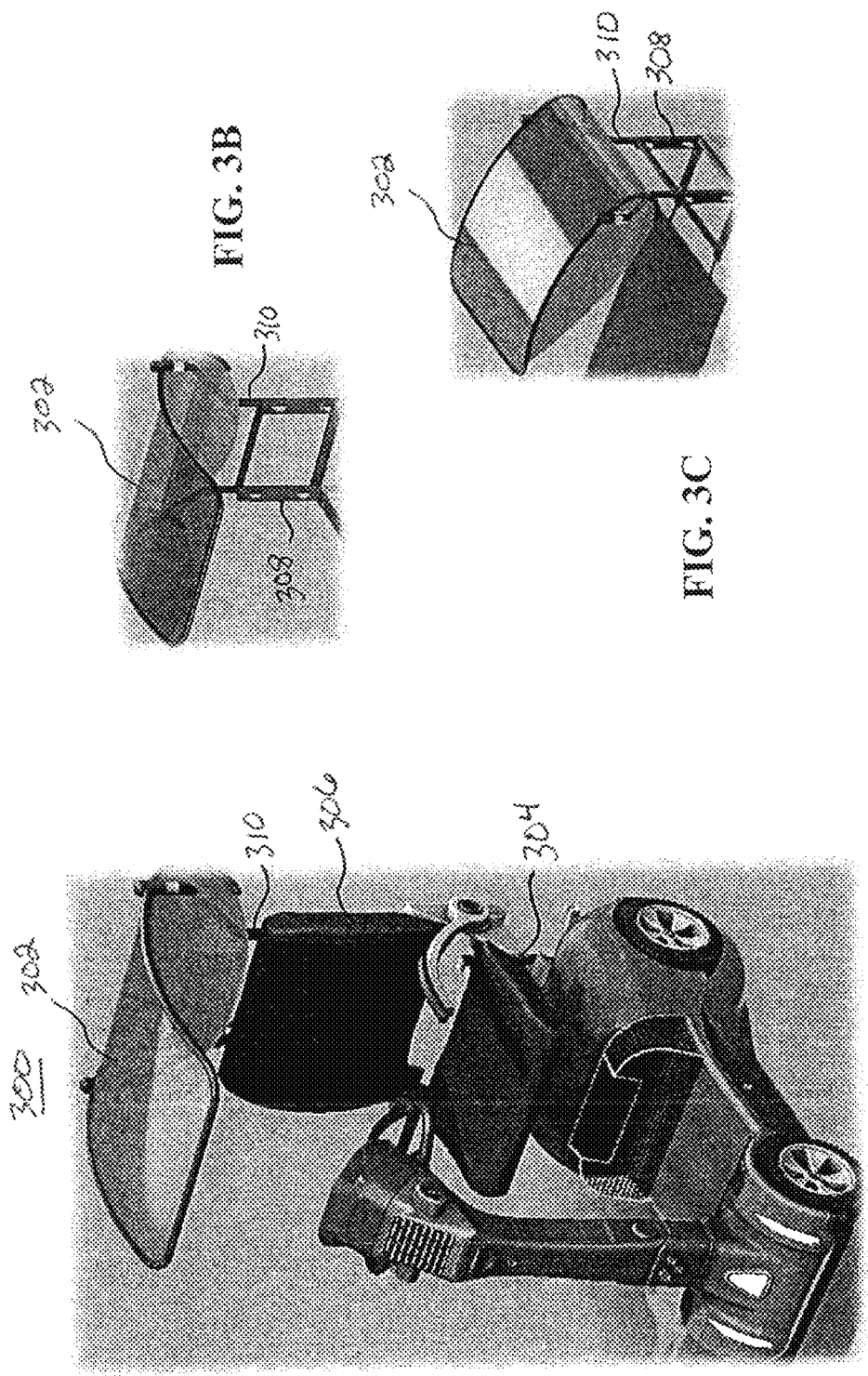

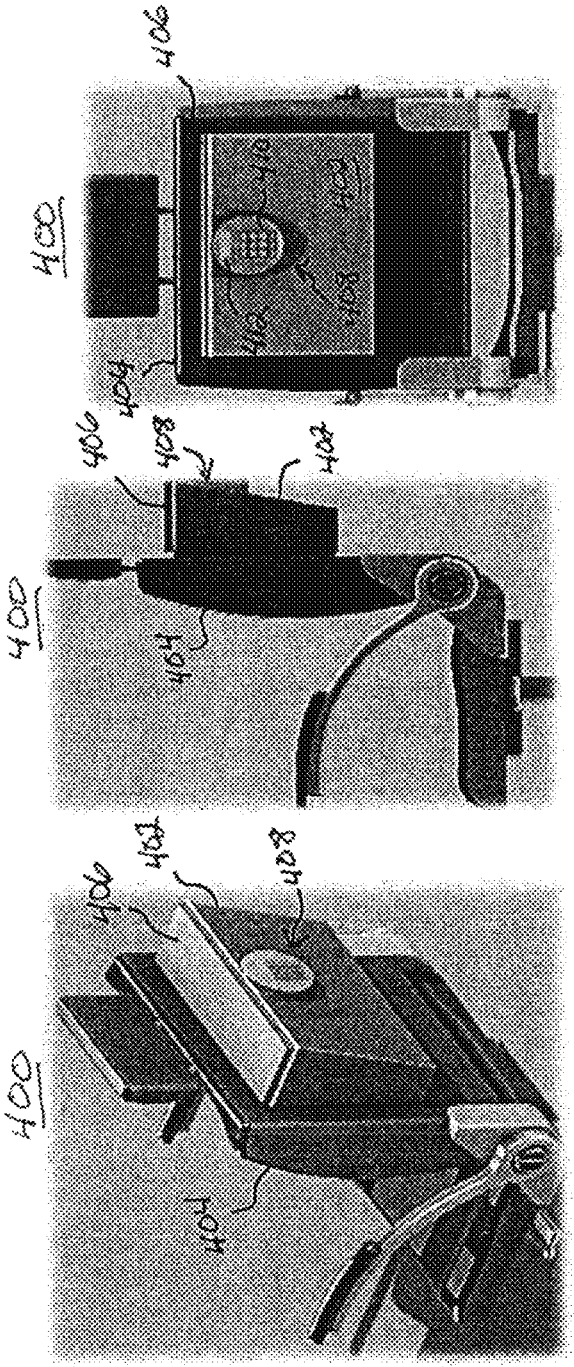

ELECTRIC CONVENIENCE VEHICLE (ECV) WITH CONTROL AND COMMUNICATIONS UNIT

RELATED APPLICATIONS

This Application is a Continuation-In-Part (CIP) of U.S. patent application having Ser. No. 15/680,054 filed on Aug. 17, 2017 and claims benefit of priority to U.S. Provisional Application Ser. No. 62/546,474, filed Aug. 16, 2017, both entitled ELECTRIC CONVENIENCE VEHICLE (ECV) WITH CONTROL AND COMMUNICATIONS UNIT, the contents of which are hereby incorporated by reference in their entirety.

FIELD OF THE INVENTION

The present invention relates to electric convenience vehicles, and more specifically, to electric convenience vehicles including a user interface.

BACKGROUND

Theme parks and other public venues, such as sports and concert venues, zoos, and other public and private venues have long been enjoyed by crowds of all ages. Other types of facilities, such as airports, hospitals, malls, retail stores, and so forth, have similar types of crowds. As understood by venue operators, crowds have a certain percentage of individuals who need assistance with walking due to injury, illness, age, or otherwise, and are generally referred to as handicapped individuals.

As has become both public policy and good business, venues often provide for powered vehicles, generally referred to as electric convenience vehicles (ECVs), that are self-propelled to enable handicapped individuals who have physical handicaps that prevent or limit walking to participate at the venue. Existing ECVs include electric powered scooters on which a handicapped individual may drive throughout the day to access different parts of a venue. Conventional ECVs are relatively simplistic, and typically include a chair mounted on a frame with wheels and a steering mechanism. A motor on the ECV is controlled to propel the ECV forward or backward by the use of a throttle, generally located on or near handles of the steering mechanism.

The ECVs, depending on the venue, may be rented to visitors by the facility or a third-party provider. Other facilities allow for a user to borrow ECVs while at the venue.

While these ECVs are helpful to the handicapped individuals, the venues and owners/operators of the ECVs do not receive commercial benefit during rental periods of the ECVs beyond rental rates by the handicapped individuals. Hence, ECVs that provide additional commercial benefits to the owners/operators of the ECVs, while increasing functionality and experience to the users of the ECVs, are desirable.

SUMMARY

An electric convenience vehicle (ECV) that improves an experience at a venue for users and improves commercial value for a venue and operator of the ECV may include a control and command unit (CCU) that improves safety for pedestrians around the ECV, reduces liability and risk of injury for users of the ECV, and provides functionality that heretofore does not exist on ECVs. The functionality ranges from venue mapping and directions, rental and reservation ordering on the ECV, venue messaging between the user and venue, locking and unlocking of a lockbox on the ECV, and so on.

One embodiment of an electric convenience vehicle may include a frame, multiple wheels configured to support and move the frame, a user support member (e.g., seat) supported by the frame, and a steering mechanism disposed toward a front portion of the ECV, and configured to enable a user to rotate direction of at least one wheel to control direction of movement of the ECV. A motor may be configured to cause at least one wheel to be propelled forward, propelled backward, or to remain in a fixed position. A throttle, when activated in a first position, may cause the motor to propel the wheel(s) in a forward direction, when activated in a second position, may cause the motor to propel the wheel(s) in a reverse direction, and when in a third position, may cause the motor to maintain the wheel(s) in a fixed position. A control and communications unit (CCU) may be disposed in front of the user support member, and be configured to communicate over a communications network.

One embodiment of a method for operating an electric convenience vehicle may include enabling a user of the ECV to control direction of movement. At least one wheel may be caused to be propelled forward, propelled backward, or to remain in a fixed position in response to the user respectively activating a throttle in a forward position, in a second position, and in an idle position. The user may be enabled to communicate over a communications network via a command and communications unit (CCU).

BRIEF DESCRIPTION OF THE DRAWINGS

A more complete understanding of the method and apparatus of the present invention may be obtained by reference to the following Detailed Description when taken in conjunction with the accompanying Drawings wherein:

FIGS. 1A-1J are illustrations of an illustrative electric convenience vehicle (ECV) that includes a control and communications unit (CCU), sensors configured to sense objects in front of the ECV, and other features that provide for safety and an improved user experience within a venue;

FIGS. 3A-3C are illustrations of an illustrative ECV inclusive of a cover or canopy that may be mounted to the seat of FIG. 3A, and used to cover a user from sun and rain, for example, while operating the ECV;

FIGS. 4A-4C are illustrations of an illustrative lockbox that may be affixed behind a backrest of a seat of an ECV;

DETAILED DESCRIPTION OF THE DRAWINGS

A. Electric Convenience Vehicle (ECV)

Figure 1A:
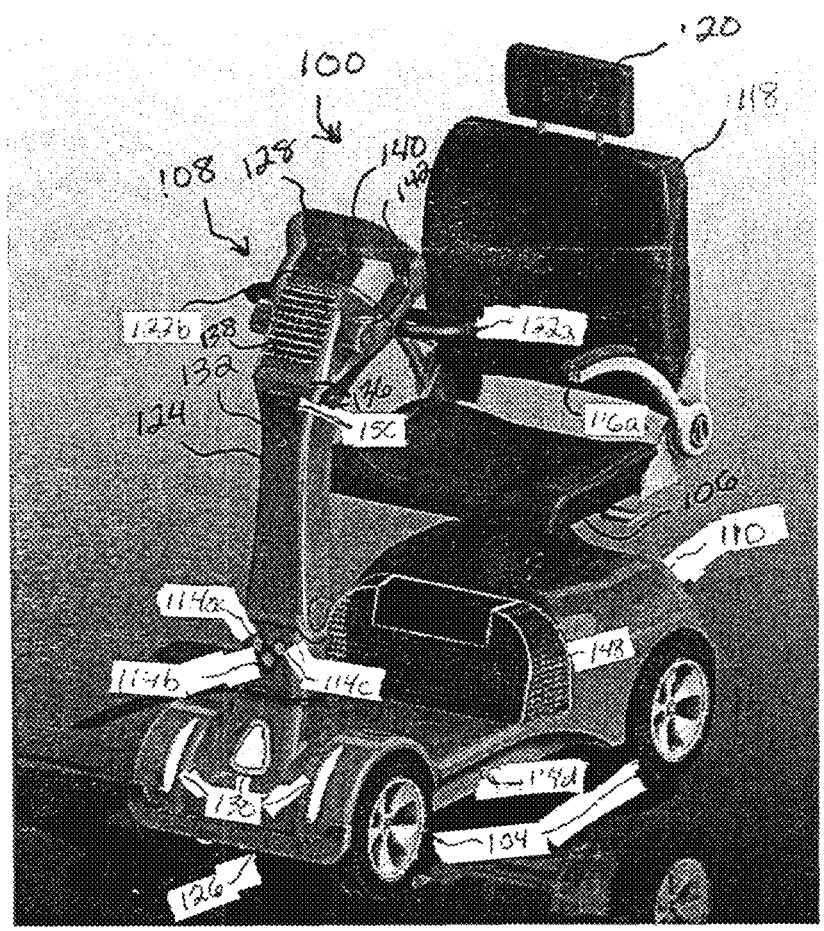

With regard to FIGS. 1A-1J, illustrations of an illustrative electric convenience vehicle (ECV) 100 that includes a control and communications unit (CCU) 102 is shown. The ECV 100 may include a frame (not shown), multiple wheels 104 configured to support and move the frame, a seat 106 supported by the frame, and a steering mechanism 108 disposed toward a front portion of the ECV 100, and configured to enable a user to rotate direction of one or more wheels 104 to control direction of movement of the ECV 100. Because the CCU 102 is intended to be used outdoors, the CCU 102 may be waterproof or otherwise protected from rain or other liquids entering a case of the CCU 102. The CCU 102 may use Android® or any other operating system for controlling operation thereof. In an embodiment, the frame may include or define a chassis (not shown) on which a body 110 is mounted. A motor (not shown) may be configured to cause at least one wheel 104 to rotate forward, rotate backward, or to remain in a fixed position.

A throttle 112, when set in a first position, causes the motor to propel the wheel(s) 104 in a forward direction, when set in a second position, causes the motor to propel the wheel(s) in a reverse direction, and when set in a third position, causes the motor to maintain the wheel(s) in a fixed position (or be in a neutral or non-engaged state in which the wheel(s) can roll with a force applied to the ECV 100). It should be understood that the throttle 112 may have a wide variety of physical configurations that provide for the forward, reverse, and maintain position functionality. The throttle 112 may be shaped as a "wig-wag" that has three states or positions, where a resting state is neutral that inhibits motion or does not apply a force to at least one wheel 104, a left tilt state that applies a forward force to the wheel(s), and a right tilt state that applies a reverse force to the wheel(s).

One or more sensors 114a-114c may be directed to detect objects in front of a direction of travel of the ECV 100, sensors 114d and 114e (FIG. 1C) may be directed to the side of the ECV 100 to detect objects to the sides of the ECV 100, and sensors 114f and 114g may be directed to the rear of the ECV 100, where the collective of the sensors 114a-114g are referred to herein as sensors 114. Each of the sensors 114 may be configured generate sense signals (see, for example, FIG. 9) indicative of an object being sensed by any of the sensors 114.

The control and communications unit (CCU) 102 may be disposed in front of the seat 106, and be configured to receive the sense signals and to control operations of the motor, where the CCU is further configured to communicate over a communications network (see, for example, FIG. 14), such as a CAN bus or other communications bus. The CCU 102 is also referred to herein as an electronic digital dash (EDD). The sensors 114 may be configured to sense objects around (e.g., in front of, to the side, and to the rear of) the ECV 110, and the CCU 100 and/or other electronic device(s) may be configured to control operations of the CCU 100 so as to provide for (i) safety of the user of the ECV 110 and pedestrians around the ECV 110 and (ii) an improved user experience within a venue (e.g., at an amusement park).

With further regard to FIG. 1A, the ECV 100 the chair 106 is supported by the chassis above the body 110. In this case, the chair 106 includes armrests 116a and 116b (collectively 116) on each side of the chair 106 to assist a user to get on, get off, and remain on the chair 106, a backrest 118, and a headrest 120. The seat 106 may be height and angle adjustable. The steering mechanism 108 may include handlebars 122a and 122b (collectively 122) that a user uses to control direction of motion of the ECV 100. The steering mechanism 108 may also include a tiller 124 that extends downwards from the handlebars 122 to the body 110, and the tiller 124 is configured to rotate in response to the user moving the handlebars 122 that are attached to the tiller 124.

The sensors 114 are shown to be mounted to the tiller 124 such that the sensors 114 are able to sense objects, such as people, walls, curbs, etc., in front of the direction of travel of the ECV 100. Moreover, as the sensors 114 are mounted to the tiller 124 that rotates, the sensors 114 sense objects as a function of the angle of the tiller 124, which is different from sensors that may alternatively be mounted to a front bumper 126 of the ECV 100 that remains stationary, where bumper-mounted sensors (not shown) would sense objects in front of the bumper 126 of the ECV 100 as opposed to an immediate directional change of the tiller 124 that leads a directional change of the ECV 100. For example, if a user of the ECV 100 turns the tiller 124 by exerting a force on the handlebars 122, then the sensors 114 sense an object prior to the time that the front bumper 126 of the ECV 100 faces the object.

Other features on the front of the ECV 100 may include lights 130 disposed on the body 110. The lights 130 in this case include left, right, and center lights that are used for illuminating a path in front of the ECV 100, but are also ornamental in nature. The CCU 102 may be configured to turn ON and OFF the lights 130. In an embodiment, the CCU 102 may be configured to turn the left and right lights ON/OFF independent of the center light. In an alternative embodiment, rather than the CCU 102 controlling operation of the lights, a physical component (e.g., button or switch) may control operation of the lights 130.

Figure 1B:
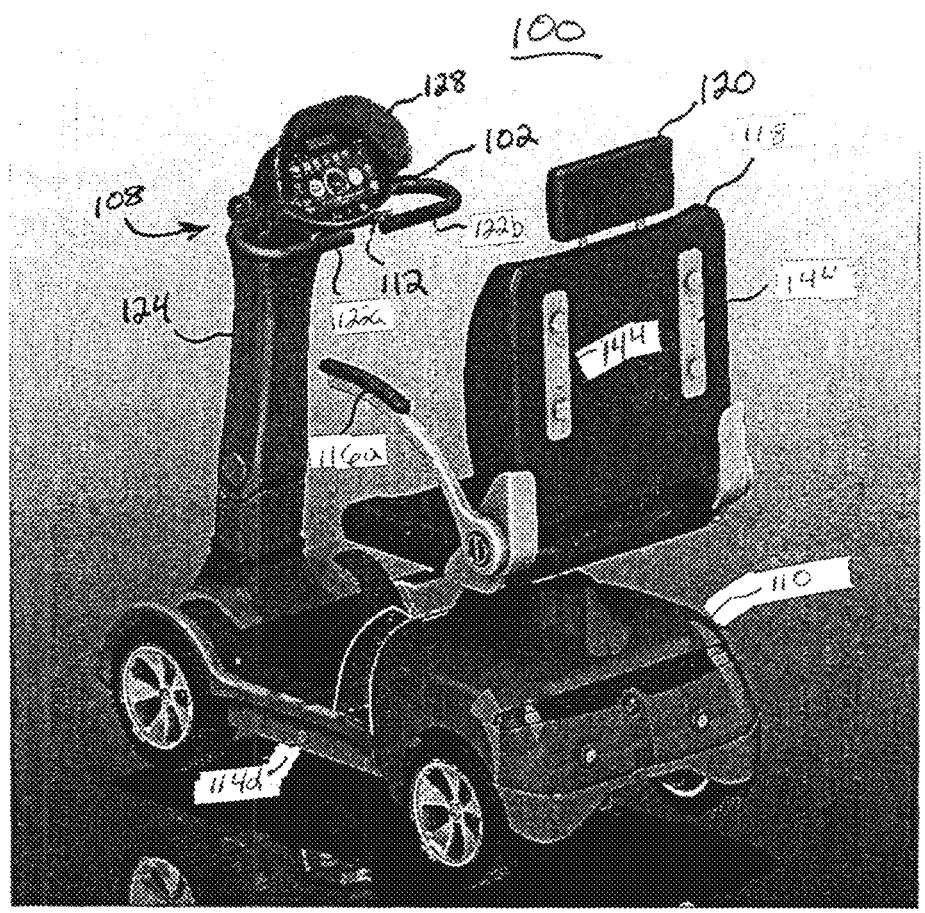

In an embodiment, the tiller 124 may have a front camera 132 disposed thereon for capturing images. The images may include video and/or still images, which may be stored and used in the event of a collision, for example. In an embodiment, the images captured may be low-resolution video images so as to consume less memory than high-resolution images, and communicated from the camera 132 to the CCU 102 for storing and/or processing thereby. In an embodiment, the low-resolution images may be stored daily at a remote server to provide backup video for potential future accident claims. In addition to the front camera 132, and as shown in FIG. 1B, the ECV 100 may also include one or more rear cameras 134a and 134b (collectively 134) that may also be configured to capture images (e.g., high-resolution images for display and low-resolution images for storage) when the ECV 100 is backing up, and communicate the images to the CCU 102 for storing and/or processing. The captured images (e.g., low-resolution images) may be stored for historical recordation purposes, for example, such as to aid in the event of an accident or collision occurring. High-resolution and/or low-resolution images may be stored to preserve a day of memories for the user.

In addition to the lights 130, a running/charge indicator light 136 may illuminate in one or more colors using light emitting diodes (LEDs) or other illumination devices to provide a notification to users, operators, and/or pedestrians status information. For example, the running/charge indicator light 136 may be illuminated in white when in run mode (e.g., turned ON and moving or stationary). When being charged by a charger, the light 136 may be illuminated as green when fully charged and in electrical communication with a charger, yellow when not fully charged, and red when not charged. The charger may be a wired or wireless (e.g., capacitive) charger. If not in electrical communication with a charger, then the notification light 136 may notify users whether the ECV 100 is currently being rented or otherwise being used (e.g., green bright/dark/bright transition) or not currently being rented or used (e.g., red bright/dark/bright transitioning), for example. The light 136 may be controlled to display other colors (e.g., orange, purple), patterns, or other illumination signaling for a variety of reasons. For example, the light 136 may flash red if a failure of the ECV 100 or CCU 102 is detected.

A photovoltaic cell 138 may be positioned on the tiller 124, and in electrical communication with a rechargeable battery (not shown) for use in powering the CCV 100 for providing mobility and/or powering the CCU 102 if a separate battery is included for powering the CCU 102 independent of the battery for powering the motor that propels the ECV 100. In an embodiment, a main battery and a backup battery may be provided, where the backup battery may be smaller than the main battery, and be used in response to the main battery running out of charge. A light sensor 140 may be provided to sense ambient light, and generate an ambient light signal for use in controlling brightness (e.g., day/night setting) of an electronic device of the CCU 102 so that brightness of the CCU 102 is high during the daytime and low during the nighttime or if the ECV 100 is in a shadow or tunnel, for example. In an embodiment, a USB charger port 142, which may be in communication with the CCU 102 for downloading and uploading content data (e.g., captured images or videos) or setting information, may be provided to enable a user to charge his or her mobile device or otherwise communicate with the CCU 102. In an embodiment, dual USB charging ports may be provided to enable multiple electronic devices to be simultaneously charged.

With regard to FIG. 1B, a rear perspective view of the ECV 100 is shown. In this view, the CCU 102 disposed at a top portion of the tiller 124 above the height of handlebars 122 is shown. It should be understood that alternative configurations may be utilized, as well, such as the CCU 102 being centered in height relative to the handlebars 122. A visor or glare shield 128 partially encircling the CCU 102 may be used to help reduce glare on the CCU 102.

The CCU 102 may include an electronic display on which a user interface or dashboard may be displayed to enable the user of the EVC 100 to interact with the CCU 102 and rent, control, and/or operate the ECV 100. The user interface may display operational and non-operational information, as further described herein. The operational information may include speed of the ECV 100, remaining battery power, and other ECV operational information. Non-operational information may include venue-specific mapping information, venue-specific user information, rental information, and so forth, as further described herein.

Figure 1C:
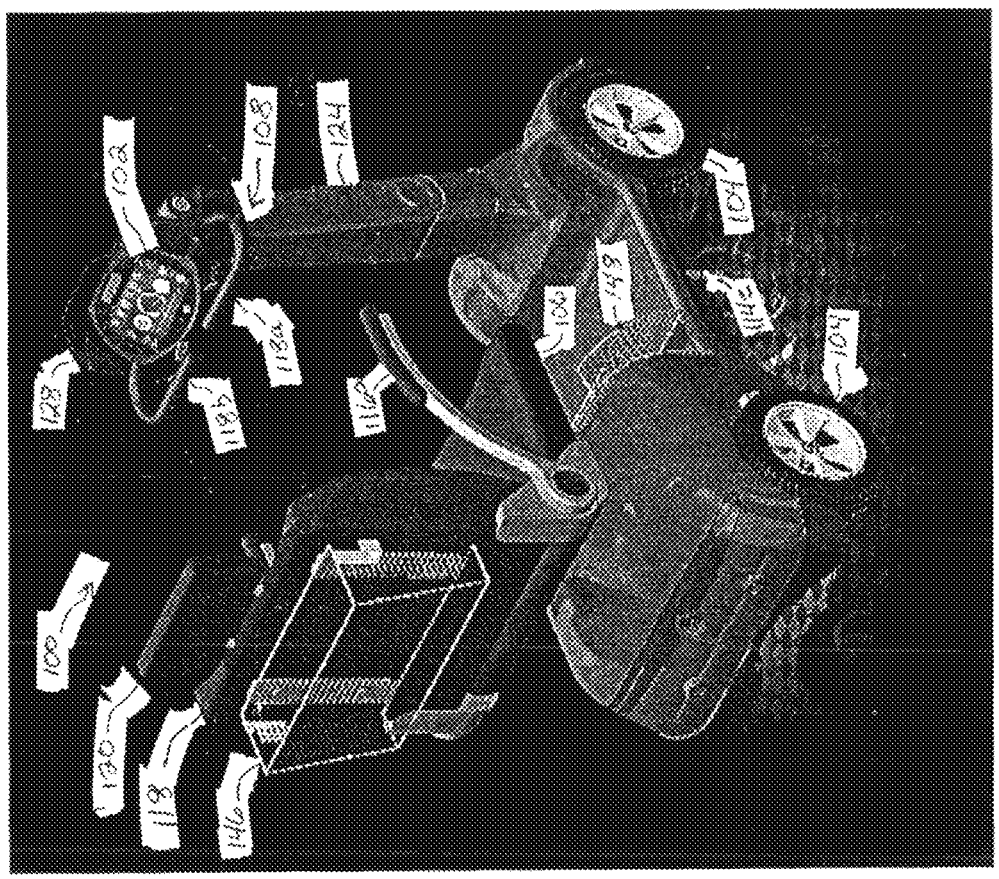
Figure 1D:
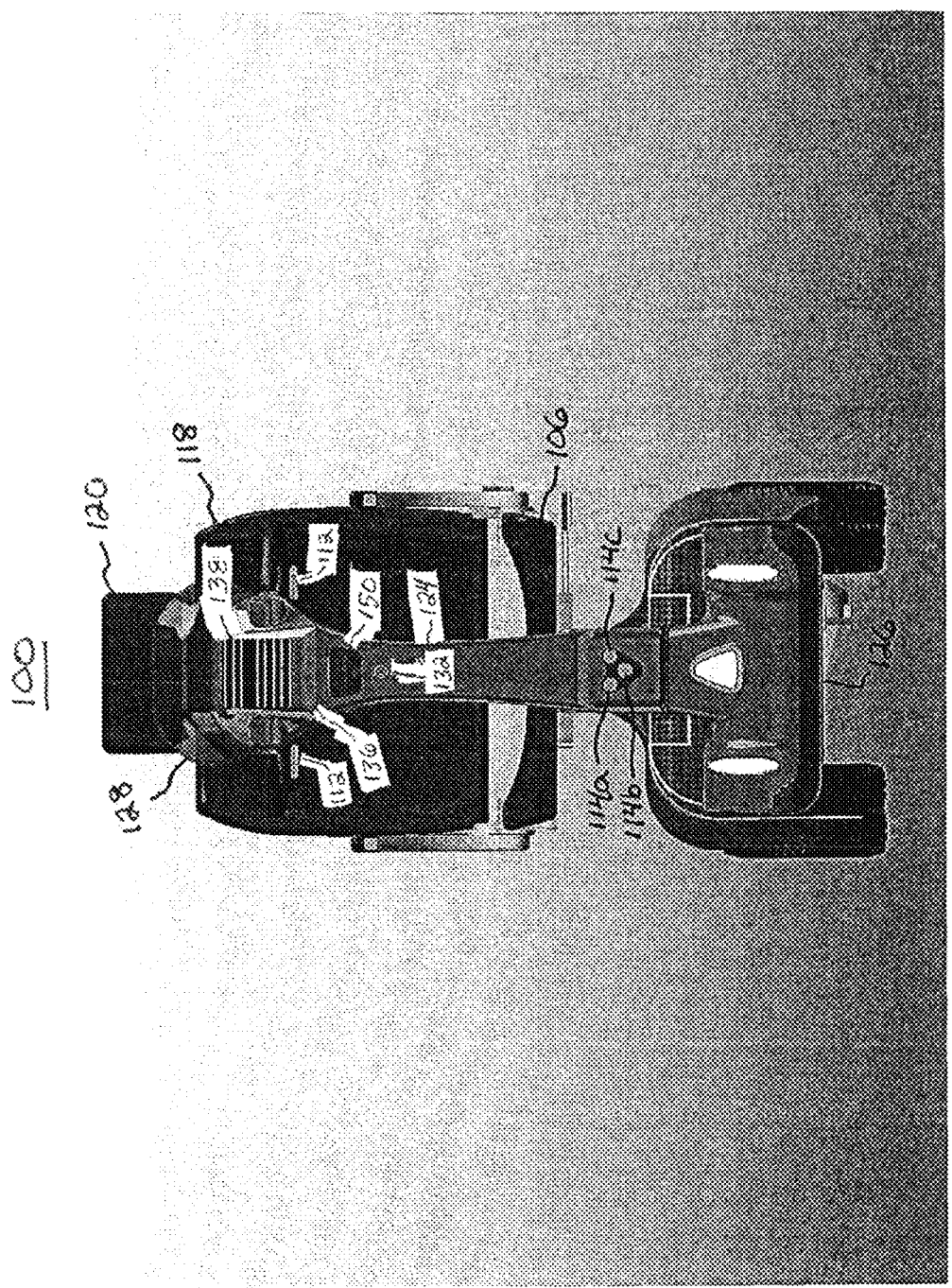
Figure 1E:
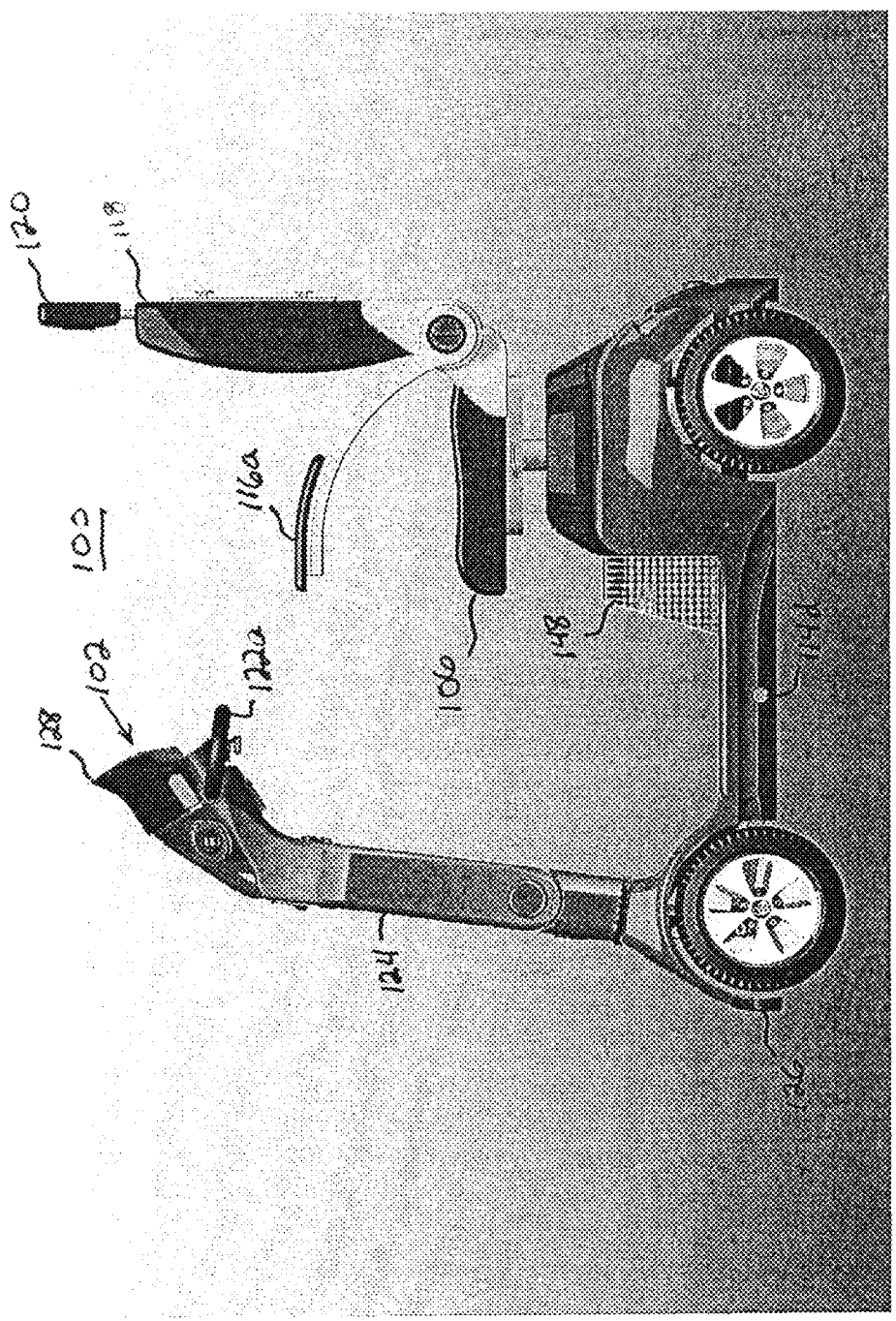
Figure 1F:
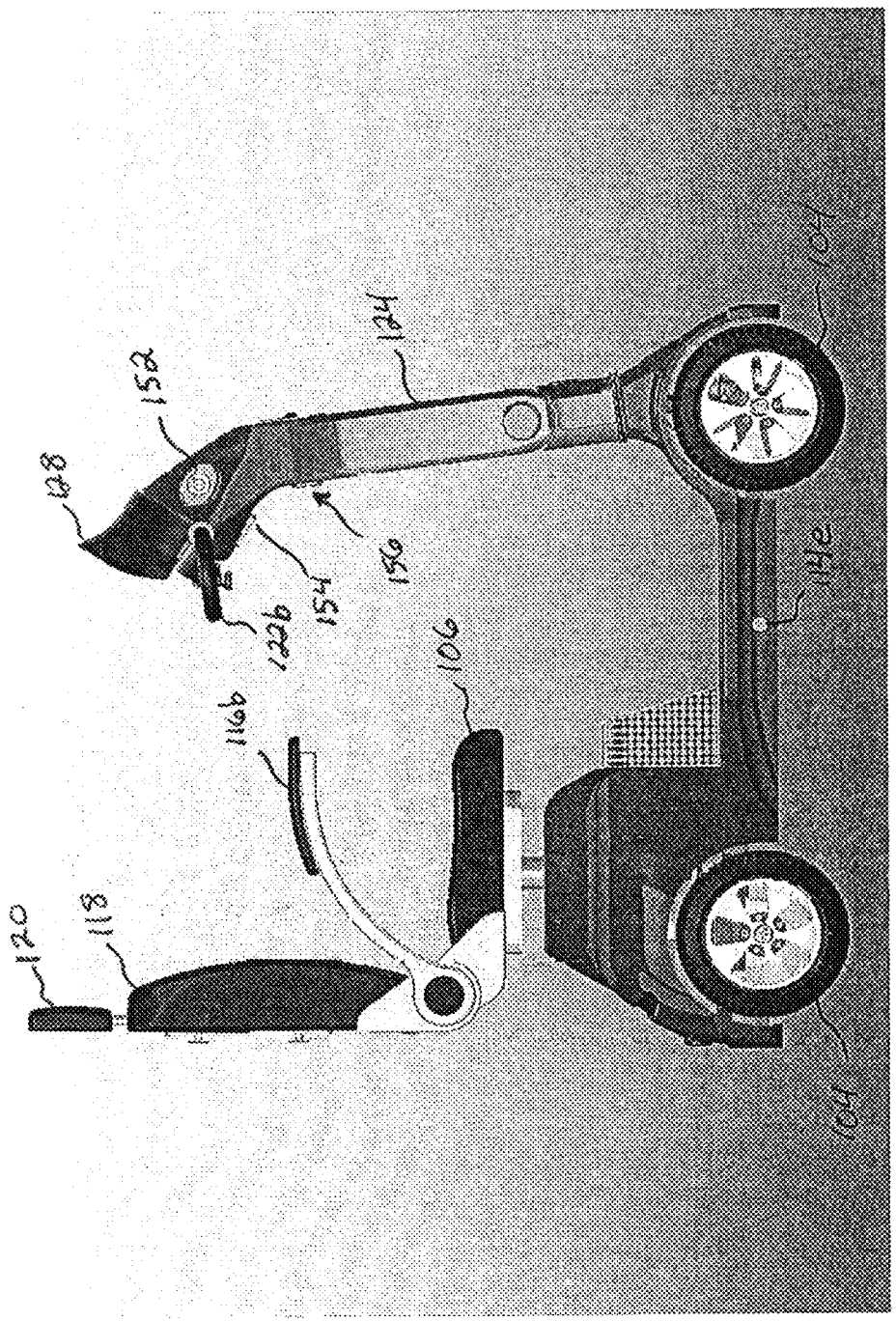
Figure 1G:
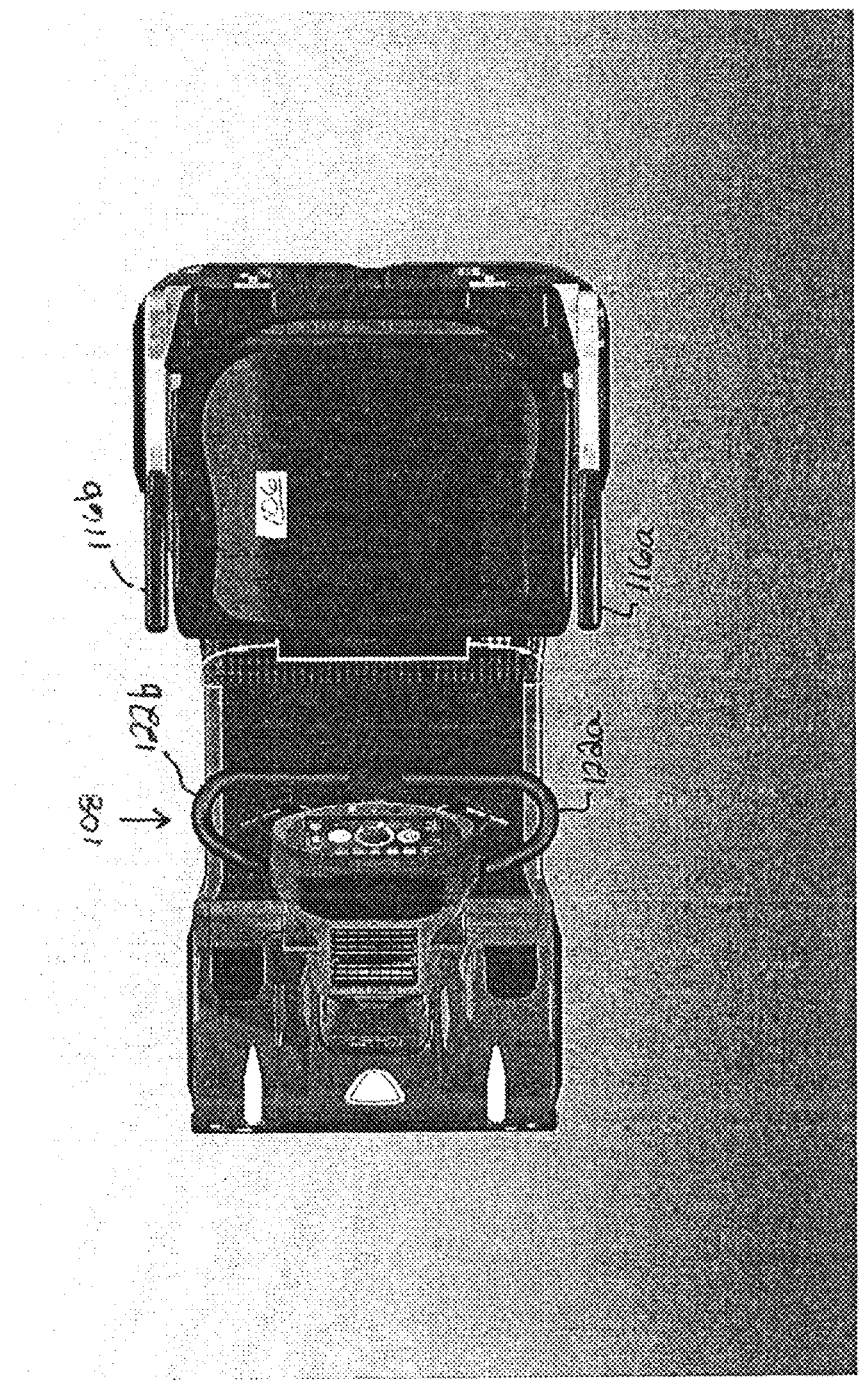
Figure 1H:
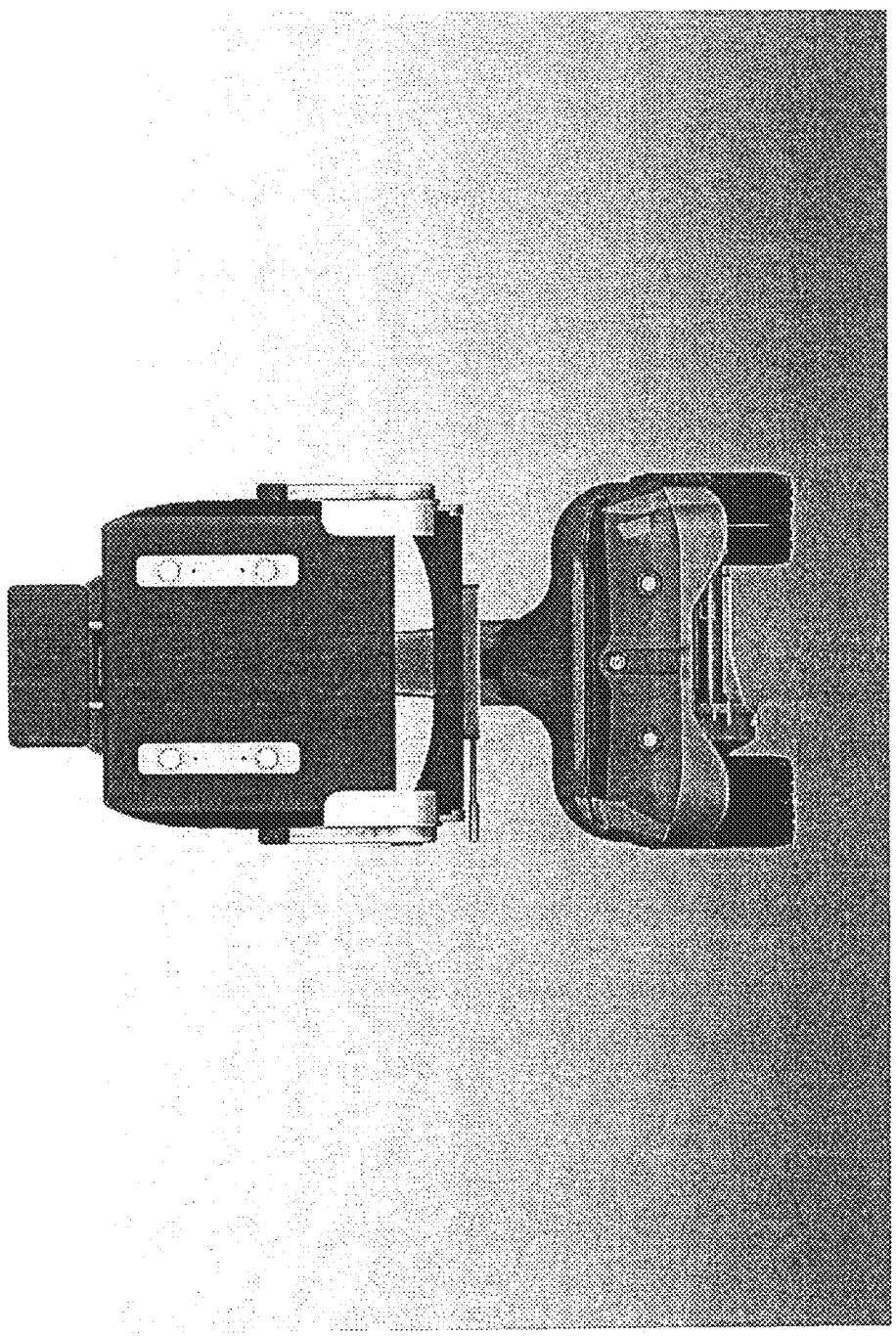

The backrest 118 may include one or more brackets 144 connected thereto, and to which various devices may be mounted. The brackets 144 may enable a basket 146 (e.g., metal mesh basket), as shown in FIG. 1C, lockbox (see, for example, FIGS. 4A-4C), holders, such as oxygen tank holder, cane holder, beverage holder, etc., umbrella holder, and/or any other holder or device that may be helpful to a user of the ECV 100 to be secured. Another storage bin 148 may be disposed beneath the seat 106, and may be formed of any material, stiff or flexible, to enable a user to store items therein.

On a rear portion of the body 110 of the ECV 100, lights 147 that indicate that the ECV is stopping or performing some other type of action to vehicles and people behind the ECV 100 are shown. In an embodiment, one or more sensors 149, such as proximity sensors, may be positioned on the rear of the ECV 100. A camera may also be positioned on the rear of the ECV 100, thereby enabling a user to see behind the ECV 100 when backing up by viewing video images received from the rear camera on the CCU 102, for example. FIGS. 1C-1J show alternative perspective and directional views of the ECV.

To charge the ECV 100, a charging port 150 may be disposed on the tiller 124. The charging port 150 may include electrical conduits that allows for a charger to connect thereto via a charger cable (not shown) having a reciprocal connector to connect with the charging port 150. The conduits of the charging port 150 may be electrically connected to a rechargeable battery (not shown). Alternative embodiments and locations of the charging port 150 may be included on the ECV 100. For example, rather than being positioned on the tiller 124, a charging port may be positioned on the body 110. Still yet, the ECV 100 may utilize wireless charging, such as inductive charging, where an inductive charging element may be placed below the ECV 100 to inductively charge a rechargeable battery via a corresponding inductive charging element.

An operator key bypass 152 may be provided to enable an operator to override control of the ECV 100 currently assigned to a user. The operator key bypass 152 may be accessed via a key, which causes control of the ECV 100 and CCU 102 to be overridden and given to an operator with the key. The key may be a conventional key or an electronic key that is coded to cause the ECV 100 and CCU 102 to provide access to some or all functions depending on the coding. For example, an operator may be an attendant who is checking on a battery level or user identifier to determine current status, or a technician who has to repair or otherwise service the ECV 100.

An RFID and/or barcode reader 154 may be positioned beneath the CCU 102, and may be configured to scan, image, and read a machine-readable indicia (e.g., barcode, QR code, RFID tag, etc.) from a variety of media. The reader 154 may be continuously ON, and ready to read a machine-readable indicia. The reader 154 may be in electrical communication with the CCU 102 to communicate data thereto. The reader 154 may receive and store text or commands associated with the machine-readable indicia for use thereby. For example, the machine-readable indicia may be a discount code, user identifier, turn-on command, or any other information or command that can be used for rental (e.g., discount to cost of rental), informational (e.g., address user by his or her name via the CCU), operational (e.g., re-verify user each time the user attempts to re-access the ECV), or other function (e.g., treasure hunt game piece).

The tiller 124 may be angled upright and towards the seat 106. To change the angle, a switch 156 may be used to perform a power adjustment using a motor within the tiller 124. The switch 156 may include a forward/backward rotate mechanism that allows for forward and back power adjustment of the tiller 124. In an alternative embodiment, the tiller 124 may include a mechanical rotational element, such as a hinge (not shown), with fixed or variable settings. Still yet, the CCU 102 may support a user interface element that allows for the user to interact to set a rotation angle of the tiller 124.

With regard to FIGS. 2A-2D, schematics showing an ECV 200 inclusive of sensors 202a-202j (collectively 202) positioned on the ECV used to sense objects in front of and around the ECV 200 and whether or not a user is sitting on the seat are shown. The sensors 202 include front sensors 202a-202c positioned on a tiller 204 configured to rotate at a joint 206 by a user turning one or more handlebars 208. The sensors 202a-202c may be arranged to sense objects in front of the tiller 204 as a function of the angle of the tiller 204. As previously described, if the tiller 204 is rotated, then the sensors 202a-202c, which are mounted to a portion of the tiller 204 that rotates, sense objects positioned in front of the rotated tiller 204. As shown, the sensors 202a-202c are configured with a sensing pattern 208 that projects approximately 6-feet outward with a height of about 3-feet. The sensing pattern 208 may further have a shape that is unobstructed by a fender or other portion of a body 210 of the ECV 200, as further shown in FIGS. 7 and 8.

Sensor 202d, which may include one or more sensors, disposed at a base portion 212 of a front fender 214 may be used to sense objects that are beneath the sensing pattern 208. The sensor 202d may be configured to sense objects or structures that are located within a certain distance of the ECV 200. For example, the sensor 202d may be configured to have a sense distance between about 3-feet to about 6-feet, where being about a distance is within a few inches, such as 3 inches.

The sense distances of the sensors 202a-202d should be long enough that the ECV 200 is capable of stopping at a rate that does not cause discomfort to a user (e.g., does not cause their heads or bodies to snap forward) in the event of an automatic slowdown by a CCU 216 or other electronics. Sensors 202e/202f, which are positioned at a center location on the left and right sides at a bottom portion of the body 210 of the ECV 200, may be configured to sense objects to below and to the side of the ECV 200 to help prevent a foot of a pedestrian or object from being run over by either of the respective left and right rear wheels 217a/217b of the ECV 200. Sensors 202g and 202h are proximity sensors mounted to a rear portion of the body 210 to sense objects behind the ECV 200. The sensors 202g and 20h may primarily be used to sense for objects behind the ECV 200 when the ECV 200 is moving backwards, and may have the same or different sense patterns as the sensors 202a-202c.

In addition to the proximity sensors 202a-202h, the ECV 200 may include user or operator sensors 202i and 202j. The sensor 202i may be positioned on a top portion of the tiller 204 and faces a seat 218 or a backrest 220 that extends upwards from the seat 218. The sensor 202i may be used to sense that a user is positioned on the seat 218. The sensor 202i may generate a sense signal in response to determining that an object, such as a person, is located a distance that is less than the distance of the seat 218 or backrest 220. A sensor 202j may be a sensor that measures weight or force placed on the seat 218. In an embodiment, the sensor 202j measures weight or force, and a circuit or software program being executed by a circuit may determine that the weight on top of the seat 202j is above a certain amount, such as 75 pounds, to confirm that the likelihood of a user sitting on the seat 218 is higher than a package or other object being placed on the seat 218. A motor controller 222 may be used to control a motor of the ECV 200. In an embodiment, a switch (not shown), which may be part of the motor controller 222, may be configured to prevent the motor from operating or from causing the wheels 217a/217b from rotating.

Figure 2A:
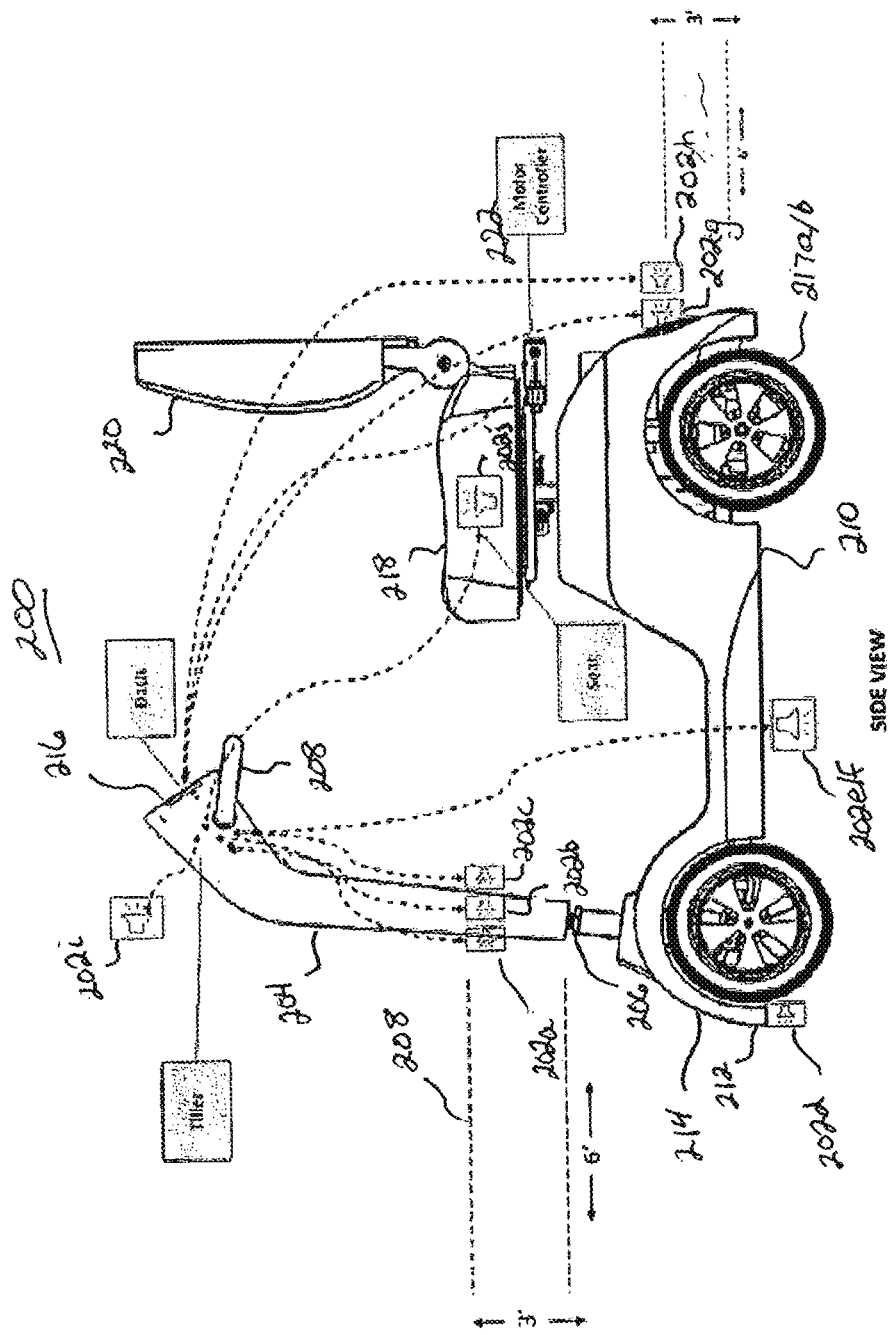
FIGS. 2A and 2B are schematics showing sensors positioned on the ECV used to sense objects in front of and around the ECV and further sense whether or not a user is sitting on the seat.
Figure 2B:
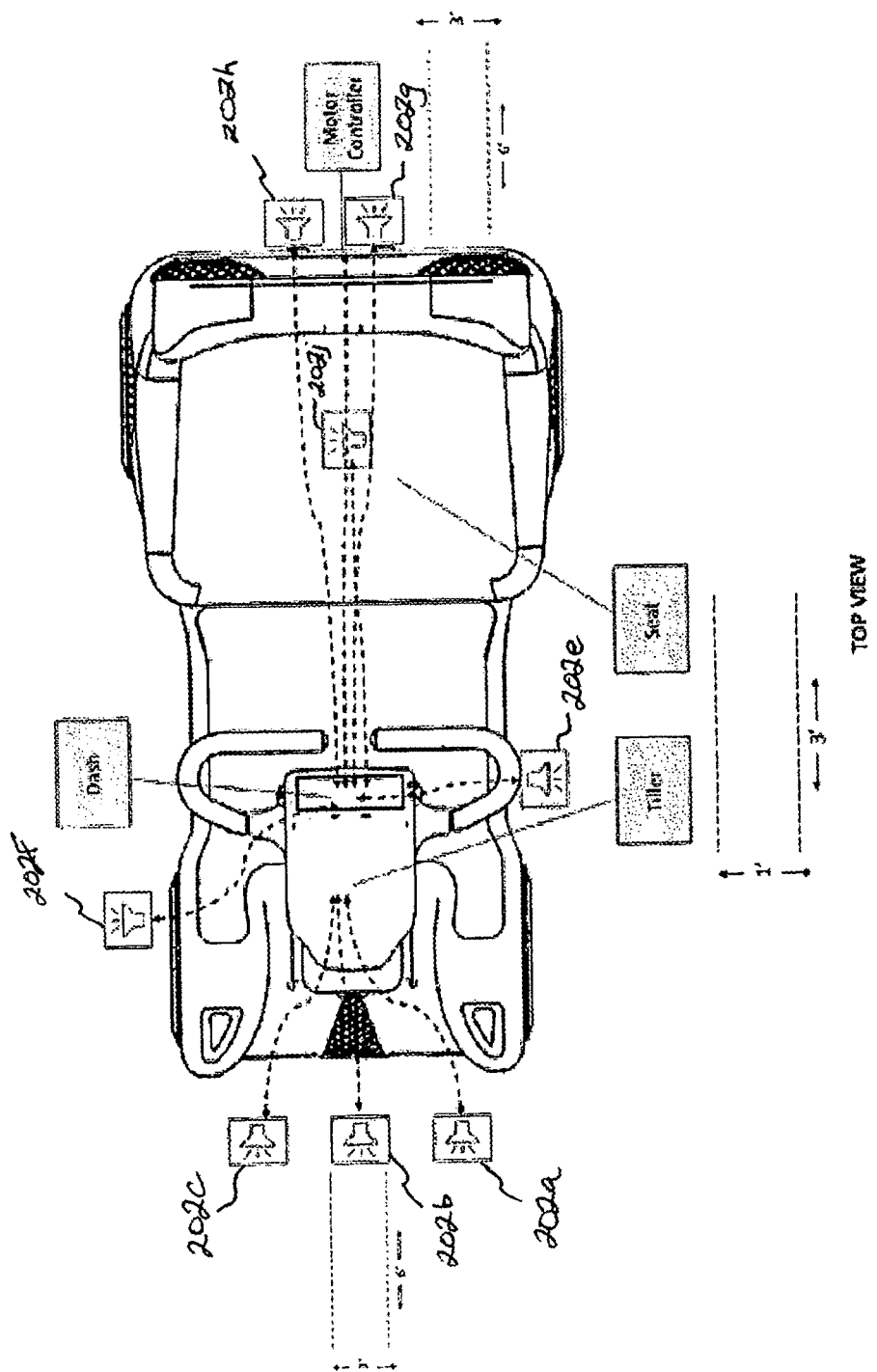

With regard to FIGS. 2B and 2C, top and side views of the ECV 200 are shown. The sensors 202 are shown to be in communication, either wired or wirelessly, in communication with the CCU 216, which may be configured to receive and respond to sense signals received from any of the sensors 202. As previously described, other circuit(s) (not shown) may be configured to receive and respond to sense signals from one or more of the sensors 202. If other circuits are utilized, then the CCU 216 may further be configured to be in communication with the other circuits to interact with the other circuits in controlling the ECV 200 or receive and record operations performed by the other circuits.

With regard to FIG. 3A, an illustration of an illustrative ECV 300 configured with a canopy 302 that mounts to a seat 304, backrest 306, or frame members 308 with structure members 310 that may connect to and/or extend through the frame members 308. The canopy 302 may be translucent, opaque, or otherwise configured to enable light or prevent light to pass therethrough. It should be understood that a wide range of configurations of the canopy 302 may be provided. In an embodiment, side members (not shown) that extend downwards or are capable of moving up and down or back to front to allow a user to further protect him or herself from sun and/or rain.

With regard to FIGS. 4A-4C, illustrations of a seat 400 of an ECV including an illustrative lockbox 402 that may be attached to a backrest 404 of the seat 400 are shown. The lockbox 402 may be mounted to one or more mounting brackets (not shown) attached to the backrest 404. In an embodiment, the lockbox 402 is formed of solid, rigid material (e.g., metal). Users of the ECV may store and secure items in the lockbox 402. In an embodiment, a rotatable or moveable cover 406 may be provided to enclose items in the lockbox 402. A user interface 408 may be mounted to the lockbox 402 that enables a user to lock and unlock the lockbox 402. In an embodiment, the user interface 408 is mounted to a wall 410 of the lockbox 402. In an alternative embodiment, the user interface 408 may be mounted to the cover 406.

The user interface 408 may include electronics that enables a user to lock and unlock a lock mechanism (not shown) that engages and disengages to secure and release the cover 406. In the embodiment shown, the user interface 408 includes a keypad 410 along with a small electronic display 412 (e.g., liquid crystal display (LCD)) that allows for the user to set a personal identification number (PIN), such as a 4-digit PIN, to lock and unlock the lockbox 402. It should be understood that a wide range of user interfaces, displays, and locking mechanisms may be utilized. For example, the user interface 408 may include a near-field communications (NFC) reader, radio frequency identifier (RFID) reader, or otherwise that enables the reading of a tag or other ID mechanism that may be on a wristband or other object, which, if correct, unlocks and locks the lockbox 402. In an alternative embodiment, the lockbox 402 may be in communication with a CCU of the ECV to enable a user to lock and unlock the lockbox 402 therefrom (e.g., via a soft-keypad either within an unlocked state of the CCU or locked state of the CCU).

Figure 5:
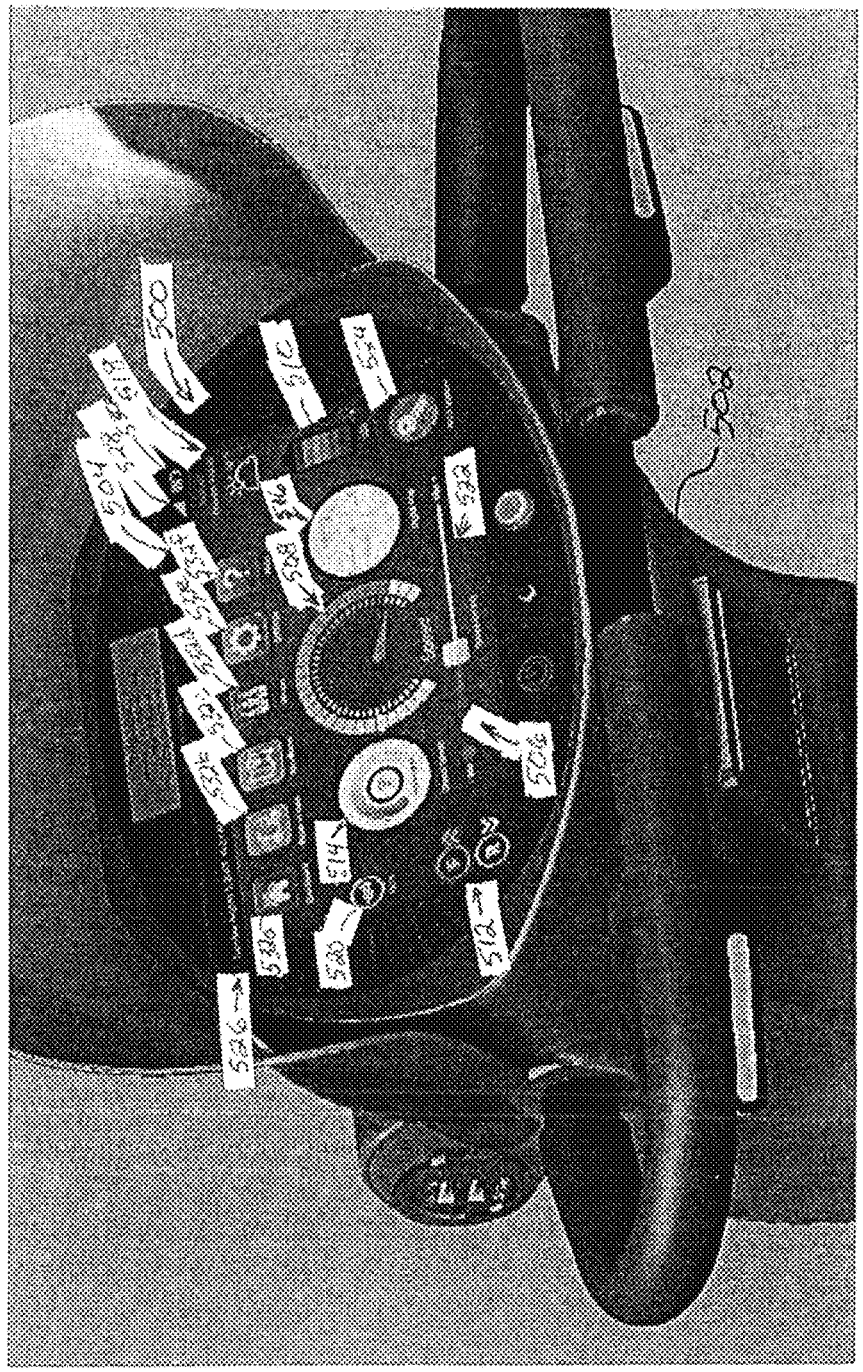
FIG. 5 is an illustration of an illustrative CCU disposed on top of a tiller of an ECV, such as shown in FIG. 1A.

With regard to FIG. 5, an illustration of an illustrative CCU 500 disposed on top of a tiller 502 of an ECV, such as shown in FIG. 1A, is shown. The CCU 500 may include an electronic display on which a user interface 506 is displayed. The user interface 506 is shown to include a number of dashboard-type features, including a speedometer 508, fuel gauge 510, in this case a battery charge level, and forward/reverse indicator 512. Other information elements, including an object sensor meter 514, digital map 516, weather information 518, horn 520, speed control limiter 522, and lock vehicle soft-button 524. Current time and date 526 may also be displayed. Because the CCU 500 may be wirelessly connected to a communications network, a connection strength indicator 528 and battery level 530 may also be displayed. In an embodiment, a compass that points to attractions (e.g., rides) or locations (e.g., entrance gate, front door, etc.) on the outside of the compass may be displayed.

The CCU 500 is meant to provide for both ECV control and information for a user. As such, the CCU 500 may be configured to execute a variety of applications or apps to support ECV and information. The apps may be accessed via app icons 532a-532n (collectively 532) by a user to execute the corresponding app. The apps may include Dashboard 532a, Rent/Return 532b, Wayfinder 532c, Venue 532d, Settings 532e, and Help 532n. It should be understood that additional or alternative apps may be executed by the CCU 500 and be available for execution thereby. Various aspects of the apps are further described herein with regard to FIG. 15.

Figures 6A, 6B:
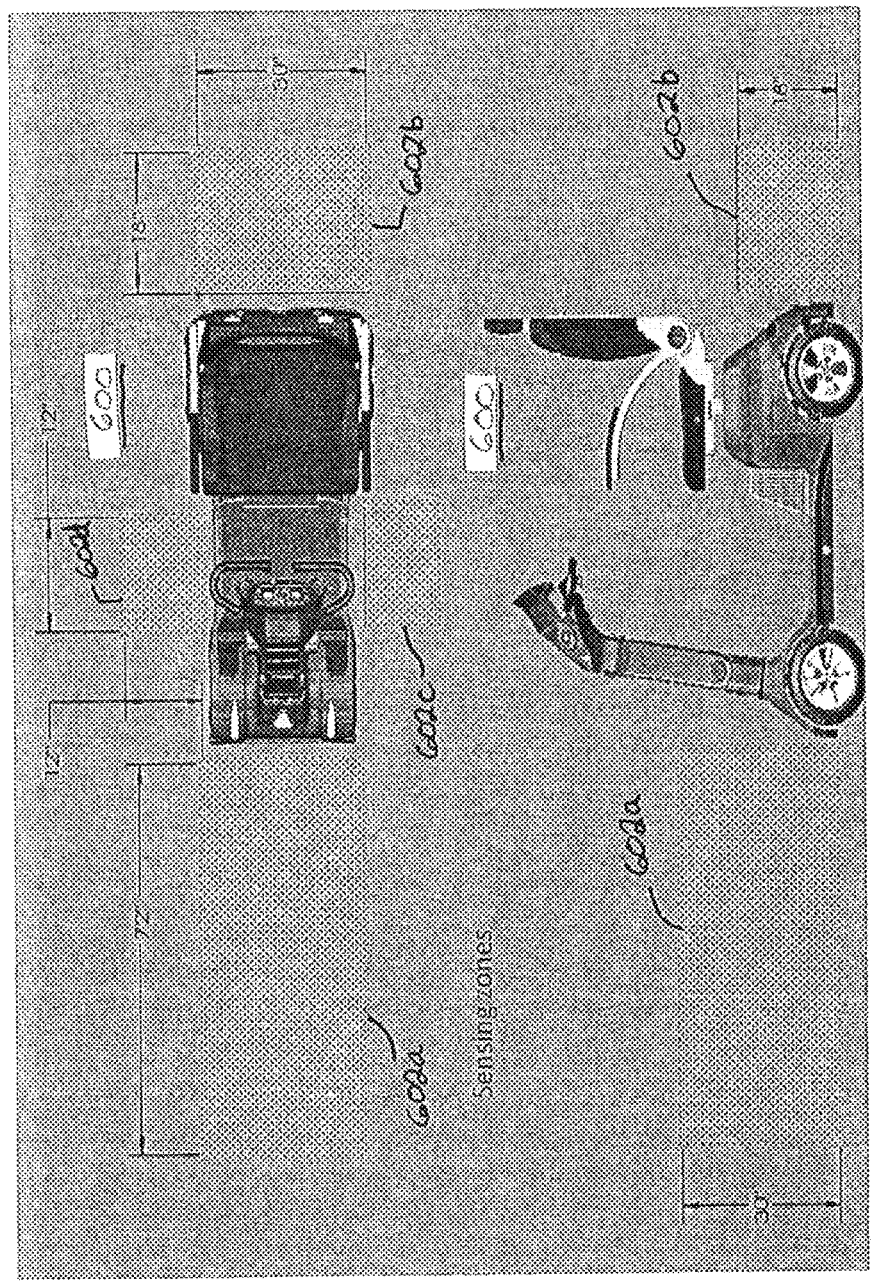
FIGS. 6A and 6B are illustrations of an illustrative ECV showing sensing zones from sensors disposed on the ECV.

With regard to FIGS. 6A and 6B, illustrations of an illustrative ECV 602 along with sensor regions or zones 602a-602d (collectively 602) are shown. The ECV 600 is shown from a top view (FIG. 6A) and a left-side view (FIG. 6B) so that the sensing zones 602 can be seen relative to the ECV 600. Sensing zone 602a is shown to have a length of 6-feet (72 inches), a width of 30-inches, and height of 30-inches. Sensing zone 602b is shown to have a length of 18-inches, width of 30-inches, and height of 18-inches. Sensing zones 602c and 602d are shown to have lengths of 12-inches and width of 12-inches. The height of sensing zones 602c and 602d may extend from the sensors downwards to or toward the surface on which the ECV 600 resides. It should be understood that alternative dimensions of the sensing zones 602 may be utilized. Although sensing zone 602a is shown to extend directly in front of the ECV 600, it should be understood that the sensing zone 602a is variable in direction as a function of the angle at which the tiller on which sensors are mounted.

The sensing zones 602 are generally defined by the types of sensors that are used for sensing objects within the sensing zones 602. In addition, the sensing zones 602 may be established by gains in electronics to which the sensors are electrically connected and/or power used to drive the sensors. Moreover, the sensing zones 602 may be dependent, at least in part, upon temperature of the sensors, where the dimensions of the sensing zones 602 may vary based on the temperature of the sensors.

It should be understood that the sensing zones 602 are illustrative, and that other sensing zones may be utilized. Moreover, the sensing zones 602 may be dynamic in that they may be manually or automatically varied depending upon environments in which the ECV is operating. For example, if the ECV 600 is operating within a crowded space, then the sensing zones 602 may be adjusted to be shorter, and if the ECV 600 is operating within a uncrowded space, then the sensing zone may be adjusted to be larger. Moreover, the sensing zones 602 may be adjusted based on speed of the ECV 600, such that if the ECV 600 is moving fast, then the sensing zone 602, at least the front sensing zone 602a, may be extended, and if the ECV 600 is moving slowly, then the sensing zones 602, at least the front sensing zone 602a, may be shortened. Alternatively, the sensing zones 602 may be fixed, and software may be utilized to adjust sensed signals.

As previously described, the sensing zones 602 are established by proximity sensors. Alternatively, different types of sensors may be utilized, such as optical sensors. For example, three-dimensional (3D) image sensor devices may be utilized to measure distance of objects from the ECV 600, and the images may be used for other purposes, as well. Alternative types of sensors for detecting range may be utilized. The sensors in the front, back, left, and right may be the same or different types as the ranges and types of objects being sensed may be different. Although not shown, a sensor at the front of the bumper facing diagonally downwards to sense objects, such as curbs or otherwise, may be included, and be the same or similar to the side sensors.

Figure 7:
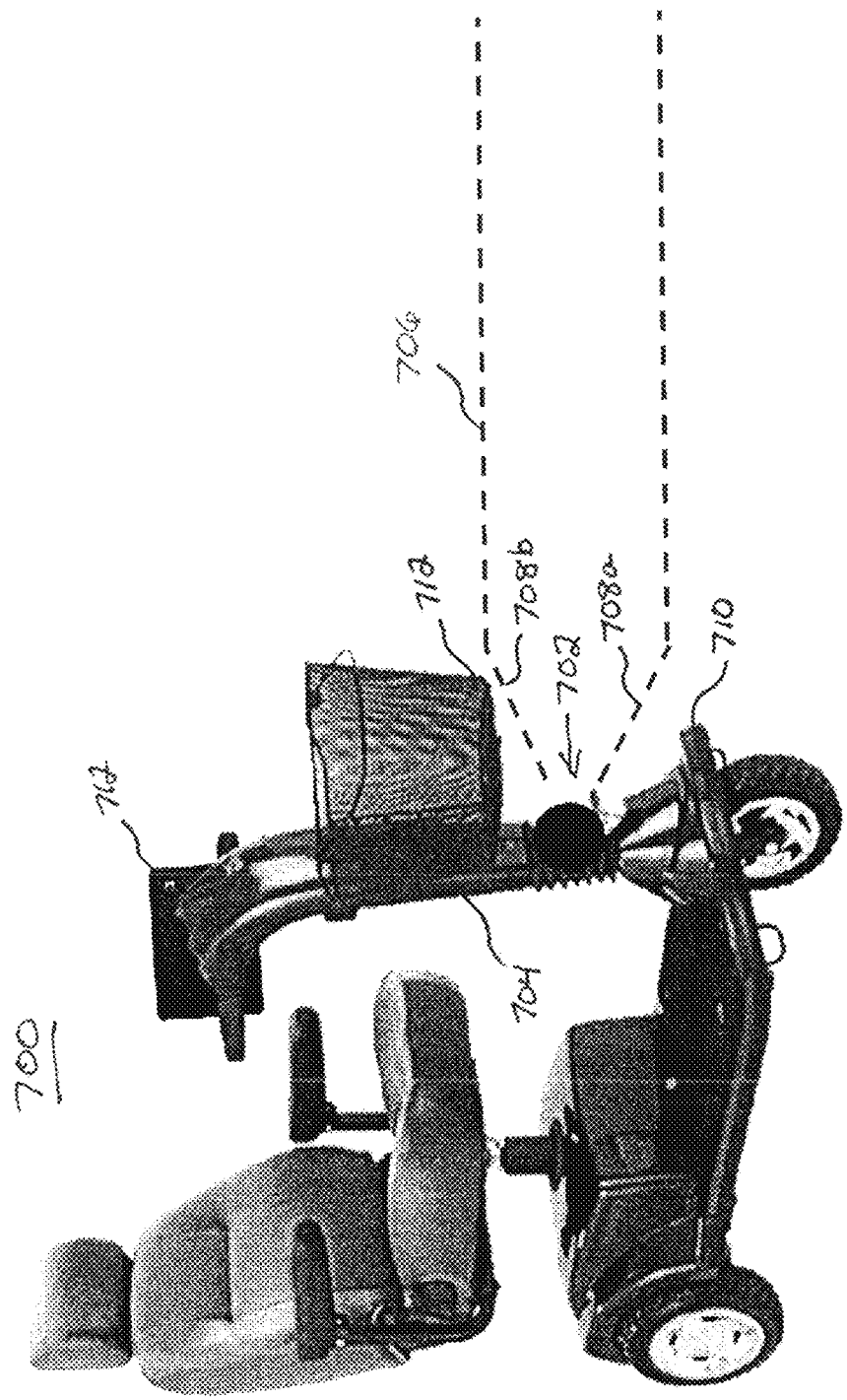
FIG. 7 is an illustration of an illustrative ECV showing a sensor mounted on a tiller of the ECV along with a sensing pattern created by the sensor.

With regard to FIG. 7, an illustration of an illustrative ECV 700 showing a sensor 702 mounted on a tiller 704 of the ECV 700 along with a sensing pattern 706 created by the sensor 702 is shown. The sensing region 706 is shown to include angled regions 708a and 708b that extend above and below a front member 710 and basket 712 to avoid having the sensing region 706 being obstructed. Sensors that provide for such a shape of the sensing region 706 may be utilized. A CCU 712 may be in electrical communication with the sensor(s) 702 so as to receive and respond to sense signals from the sensor(s) 702. Although not specifically shown, it should be understood that additional sensors for the sides and rear of the ECV 700 may also be included. Camera(s) (not shown) may also be included on the ECV 700, and be in communication with the CCU 712 for capturing and processing images.

Figure 8:
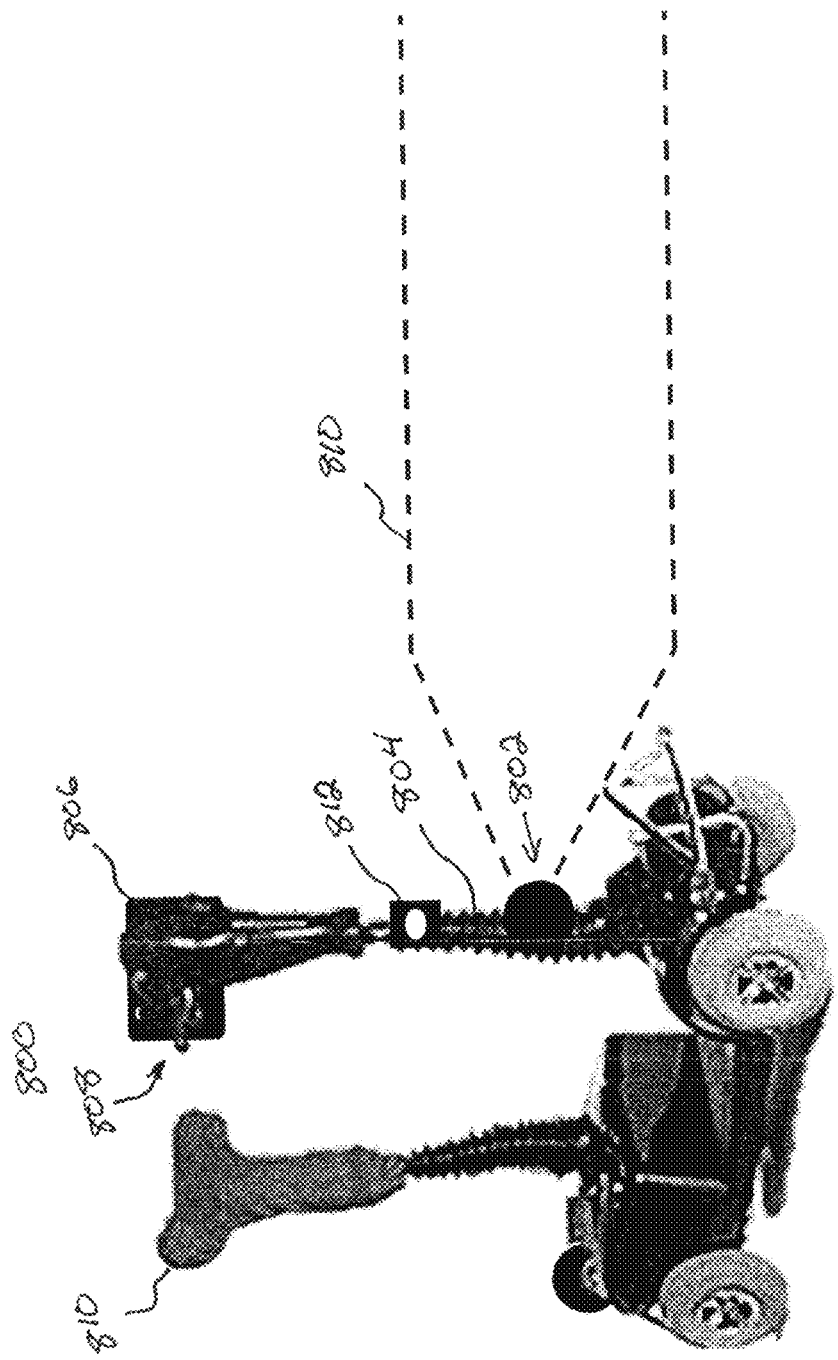
FIG. 8 is an illustration of an illustrative ECV that provides for standing by a user, and may include multiple sensors positioned on a tiller of the ECV along with a CCU disposed on a front member, in this case centered on a steering mechanism, to enable the user to view the CCU while operating the ECV.

With regard to FIG. 8, an illustration of an illustrative ECV 800 that provides for standing by a user, and may include one or more sensors 802 positioned on a tiller 804 of the ECV 800 along with a CCU 806 disposed on a steering mechanism 808 of the tiller 802 to enable the user to view the ECV 800 during operation is shown. The sensors 802 may produce a sensing region 810. The ECV 800 may include a vertical rest member 812 against which a user may lean against during operation. The vertical rest member 812 may be adjustable upwards and downwards to accommodate different heights of users. As shown, a camera 814 may also be mounted to the tiller 804 to capture images and video for use by the CCU 806. The CCU 806 may be configured and operate in the same manner or similar manner as the CCU 100 of FIG. 1A. For example, rather than sensing weight on a seat, weight on a floor or light blocked from a sensor mounted to the floor may be sensed to determine whether the user is on the ECV 800.

Figure 9:
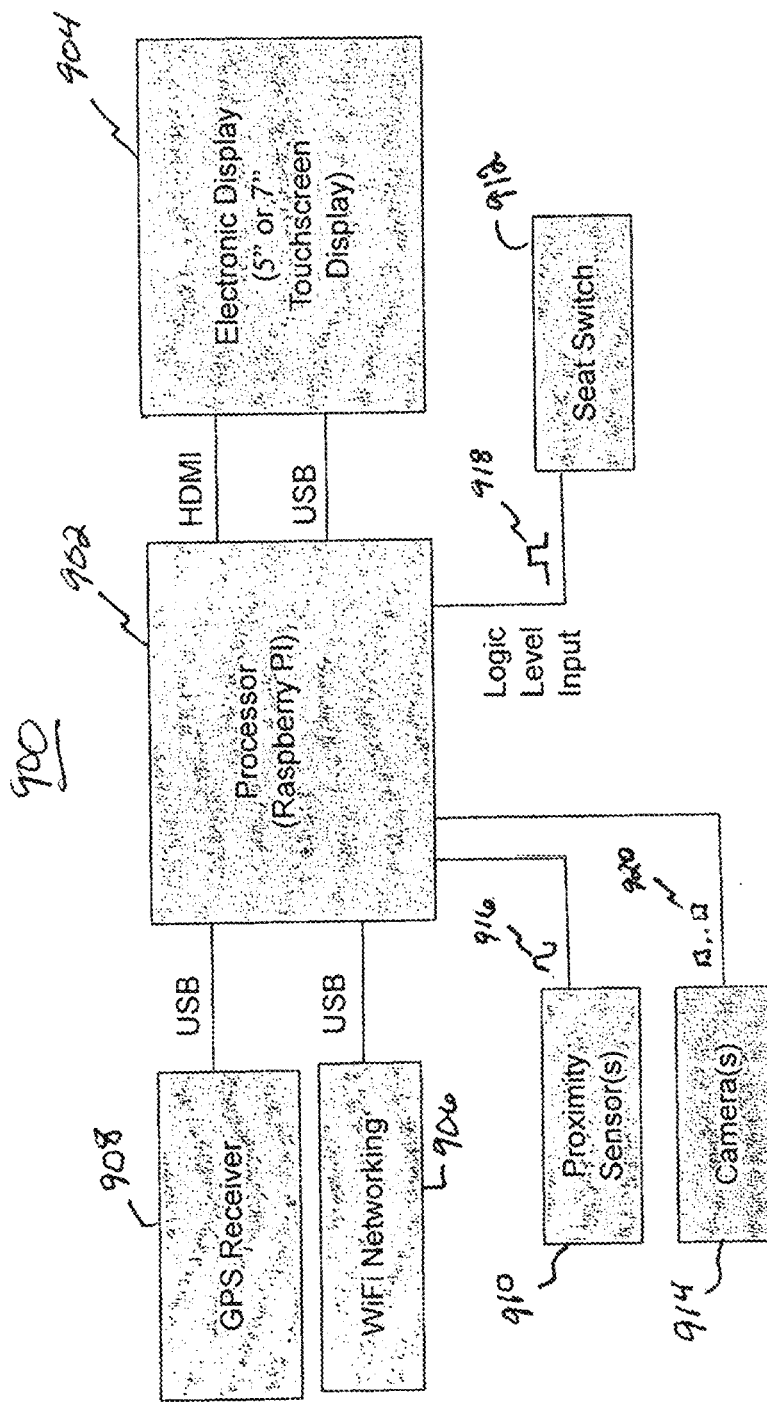
FIG. 9 is a block diagram of illustrative electronics used for controlling and operating an ECV and CCU.

With regard to FIG. 9, a block diagram of illustrative electronics 900 used for controlling and operating an ECV and CCU is shown. The electronics 900 may include a processor 902, which may include one or more computing devices, such as a general processor (e.g., Raspberry PI), image processor, digital signal processor, etc.) and electronic display 904 (e.g., 5-inch or 7-inch touchscreen display). In an embodiment, the processor 902 and electronic display may form, at least in part, the CCU with which a user may use to rent and control the ECV. A wireless communications device 906 (e.g., WiFi® transceiver) and geolocation device 908 (e.g., GPS receiver, triangulation receiver, etc.) may be included to support various data communications and application services, such as location tracking, geofencing (e.g., prevent the ECV from exiting a venue or entering restricted areas of a venue). A number of sensors, including proximity sensor(s) 910 and seat switch 912, may be included to assist with managing and controlling the ECV and CCU, as further described herein. In an embodiment, one or more video cameras 914 may be included to capture images, such as video images, for display on the electronic display 904, and for supporting other applications, such as an ECV crash recordation app in which video captured by a camera is stored for later review to determine how the incident occurred. Each of the electronics may be in communication with the processor 902 via a wired or wireless connection directly or indirectly through other networking electronics (e.g., USB, HDMI, Bluetooth®, or other communications protocols).

As shown, the proximity sensor(s) may be configured to sense proximity of objects, such as people (e.g., adults, children), structures (e.g., curbs, walls, poles, etc.), or moveable objects (e.g., other ECVs, boxes, bags, etc.), and generate sense signals 916 that are indicative of an object being sensed. In an embodiment, the sense signals 916 are analog, and the processor may convert the signals 916 to digital for processing thereby. In an alternative embodiment, the signals 916 may be digital. The signals 916 may indicate (i) angle of an object based on the angle of the sensor relative to the ECV (e.g., each of three sensors mounted on the tiller may output a sense signal level, which may be used to determine angle of an object relative to the tiller) and (ii) distance of an object based on amplitude of the signal.

Figure 10:
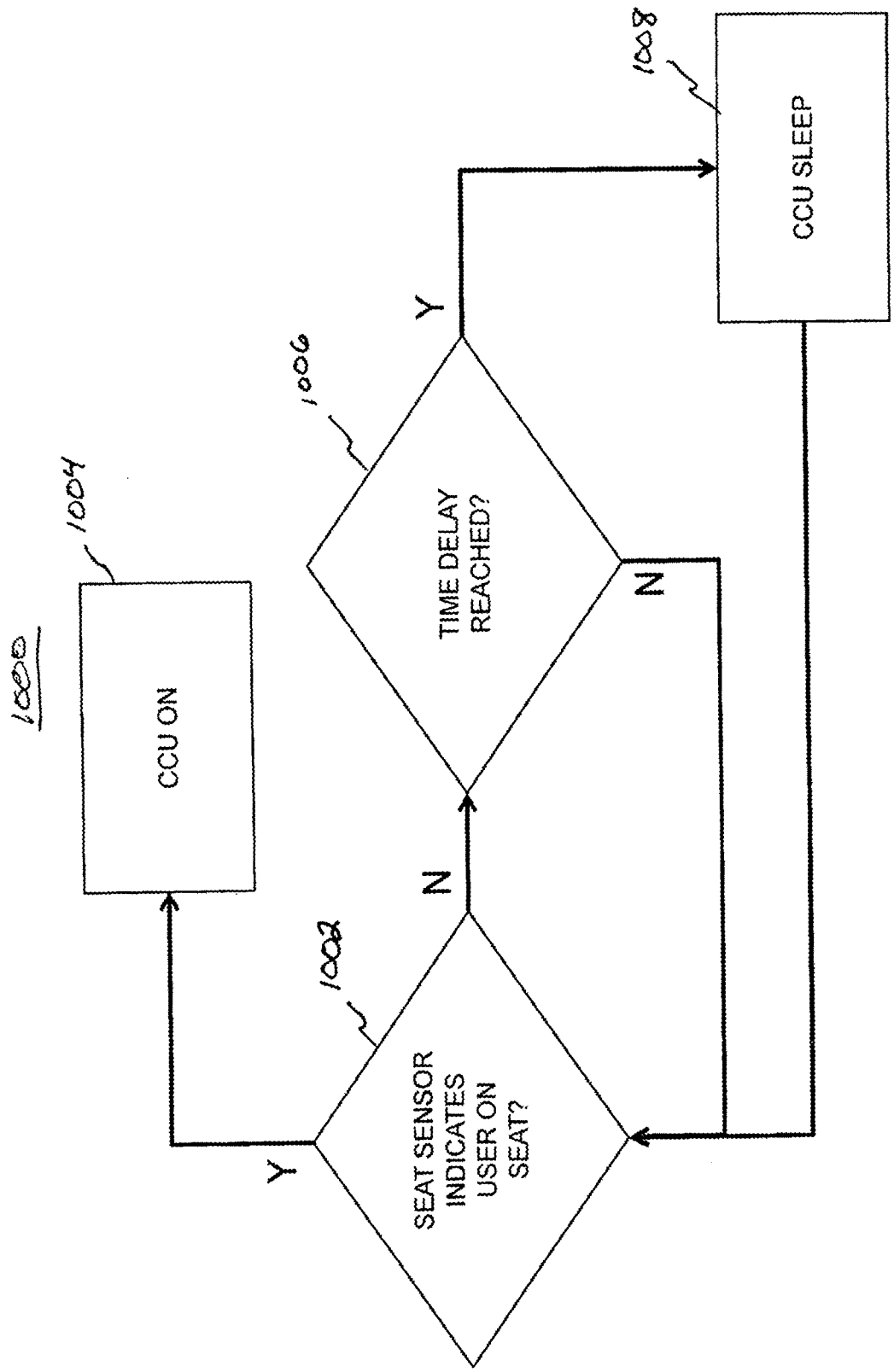
FIG. 10 is a flow diagram of an illustrative CCU control process that is used to manage battery of the CCU.
Figure 11:
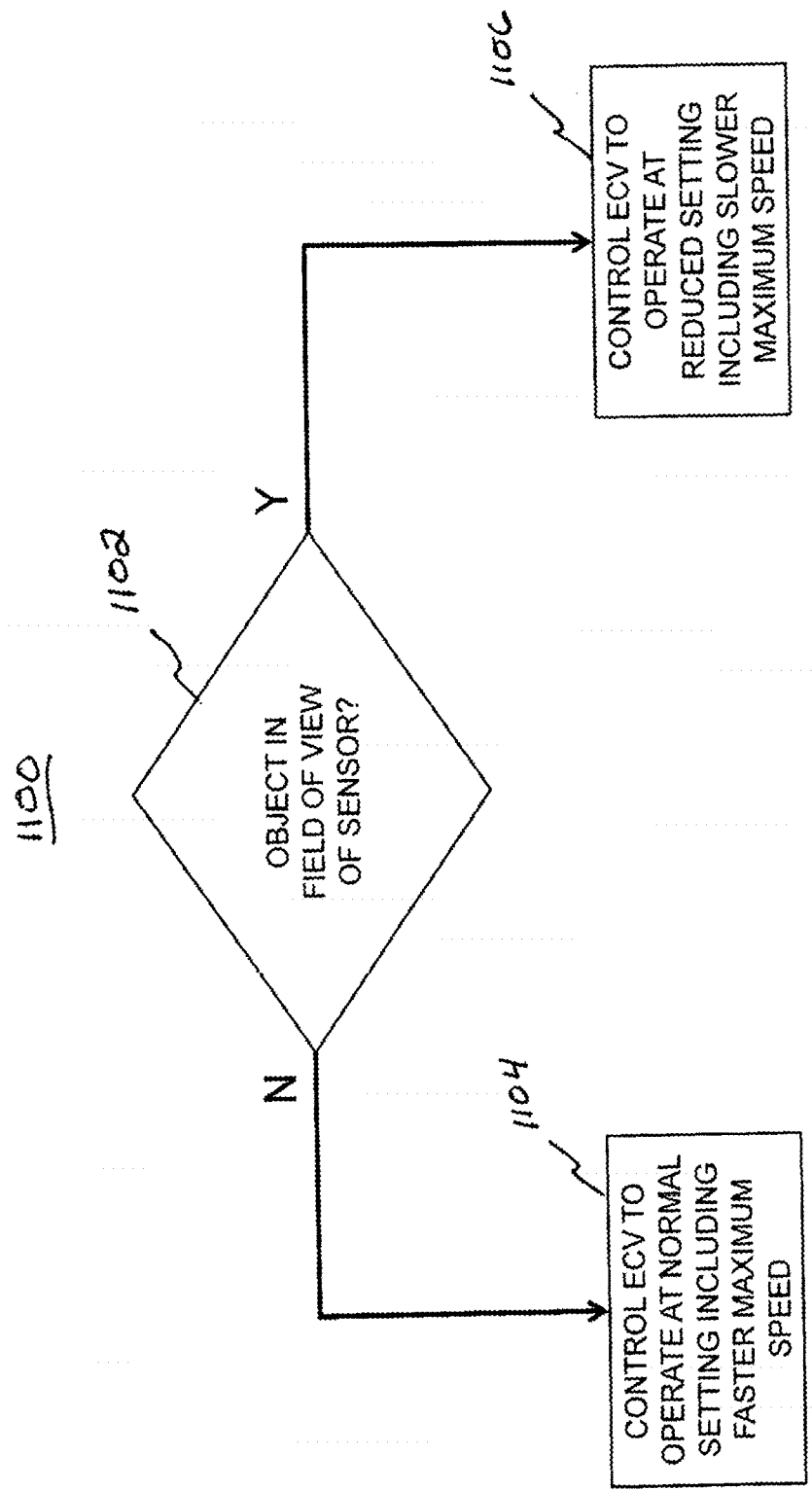

With regard to FIG. 10, a flow diagram of an illustrative CCU control process 1000 that is used to manage battery of the CCU is shown. The process 1000 may start by the CCU being in an OFF state, and at step 1002, a determination as to whether a seat sensor indicates that the user is sitting on the seat of the ECV. If the ECV is a stand-up ECV, then the sensor may sense whether the user is pressing against a vertical seat rest, for example. If so, then the process 1000 may turn or maintain the CCU to an ON state at step 1004. Once ON, the user may utilize the CCU for functional and informational purposes when operating the ECV. The CCU may be maintained ON so long as the user interacts with the CCU directly or continues to operate the ECV with the user sitting on the seat. If at step 1002 it is determined that the user is no longer sitting on the seat, then the process 1000 may continue at step 1006, where a determination may be made as to whether a time delay has been reached. The time delay may have a default, such as 5 minutes, and/or may be set on the CCU (e.g., ranging from 2 minutes to 15 minutes). The time delay allows for the user to be able to get off of the ECV to talk to someone, to get some food, to go on a ride, and so on. If the time limit has not been reached, then the process 1000 may return to step 1002 to continue monitoring the seat sensor. If the time limit has been reached, then the process may continue at step 1008, where the CCU may go into a sleep state. The sleep mode may cause the display to be turned OFF and other non-critical functions, such as wireless communications, may be turned OFF, as well. The process 1000 may return to step 1002 to continue monitoring for the user to sit on the seat, where upon the CCU may be turned back to an ON state at step 1004.

Figure 11:
FIG. 11 is a flow diagram of an illustrative ECV control process for the CCU to control operation of the ECV.
Figure 1J:
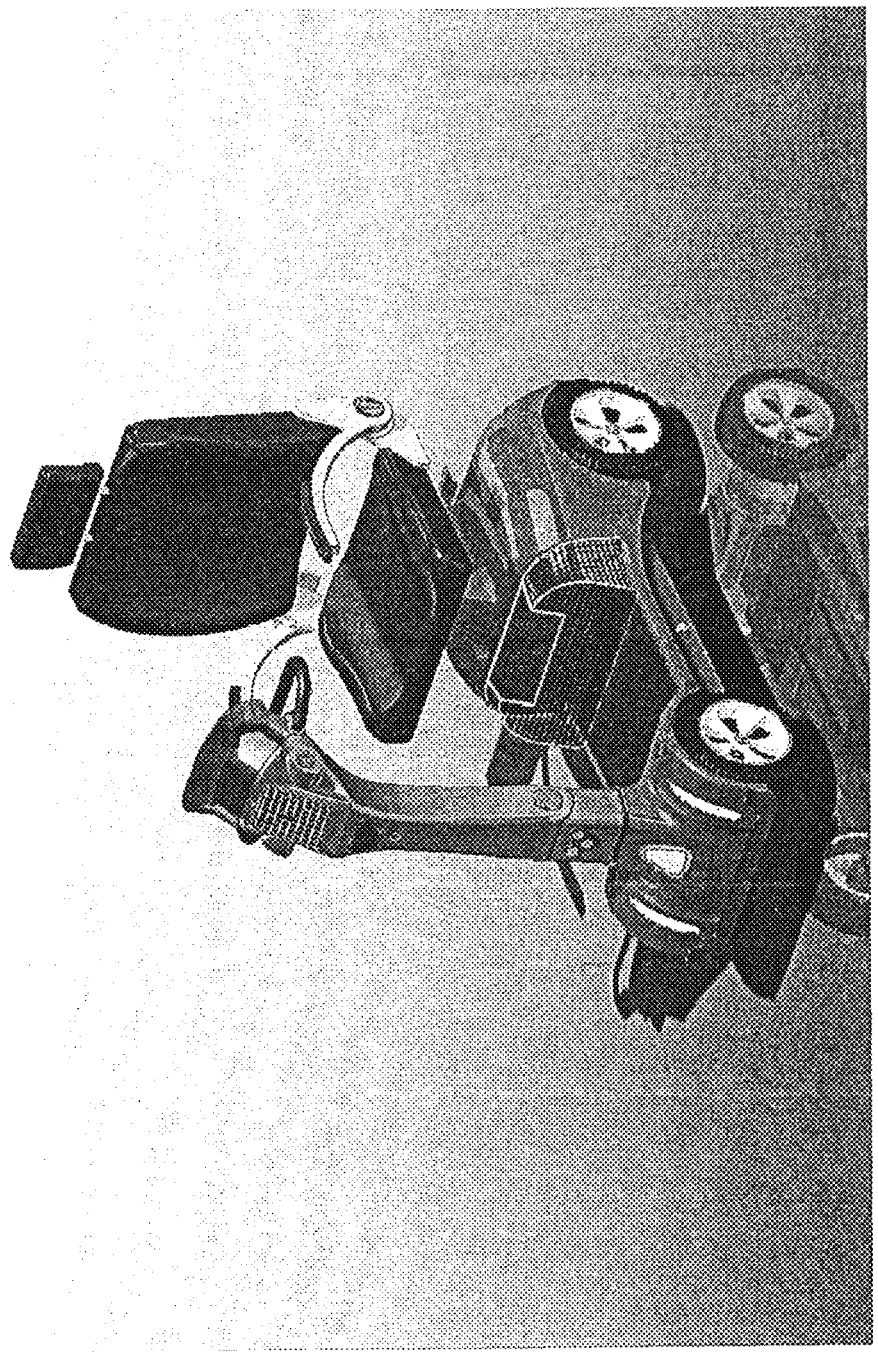

With regard to FIG. 11, a flow diagram of an illustrative ECV control process 1100 for the CCU to control operation of the ECV is shown. The process 1100 may start at step 1102, where a determination as to whether an object is in a field-of-view (FOV) of any of the sensors may be made. The determination may be intelligent and include a determination as to whether the object in the FOV of a sensor is in the FOV of a sensor that is in the direction or intended direction of travel of the ECV. For example, if an object is in the FOV of a front or side sensor and the ECV is moving or preparing to move forward, then the determination as to whether the object in the field-of-view of the sensor at step 1102 is YES, otherwise, the determination is NO. Alternatively, if an object is determined to be in view of a front sensor and the ECV is in reverse, then the determination at step 1102 is NO. If the determination at step 1102 is NO, then the process may continue at step 1104, where control of the ECV may be operated at normal settings, such as the speed of the ECV may be at a fast maximum speed (e.g., 10 mph). Alternatively, if the determination at step 1102 is YES, then the process may continue at step 1106, where control of the ECV may operate at normal settings, such as the speed of the ECV may be at a slow or reduced maximum speed (e.g., 3 or 5 mph). By reducing the maximum speed of the ECV, there is a more likely chance that the ECV will hit and injure a pedestrian or object.

The reduction of speed at step 1106 may be implemented in a number of ways. For example, rather than instantaneously dropping the maximum speed, the maximum speed may be reduced in a sloped manner (e.g., linearly ramped downward from the top maximum speed to the lower maximum speed), thereby preventing the ECV from slowing too fast and causing discomfort to the user or otherwise. Similarly, if the maximum speed is increased from the lower speed, then the transition may be sloped, so as to prevent the ECV from speeding up too fast and avoiding causing discomfort to the user or otherwise. The limitation of the maximum speed means that if the user is applying a throttle at a maximum level that the speed of the ECV will be limited to the maximum speed established and controlled by the CCU. The CCU, in enforcing the maximum speed limit, may apply a control signal to a motor of the ECV that causes the ECV to travel no faster than the maximum speed limit. Hence, if the maximum speed is transitioning from fast to slow, then if the throttle is positioned to go maximum speed, then the CCU will transition the ECV from the fast maximum speed to the slow maximum speed at the transition slope. In an embodiment, the CCU may be configured to not only transition the maximum speed from fast to slow, but also stop the ECV in response to sensing the object at a near distance, especially close to the front of the ECV or directly in front of rear tires, by causing the motor to slow even more and/or apply automatic brakes if a determination is made that the object will be hit by the ECV if the user does not take evasive action by either turning the steering mechanism (e.g., rotating the tiller) or applying the brake.

Figure 12:
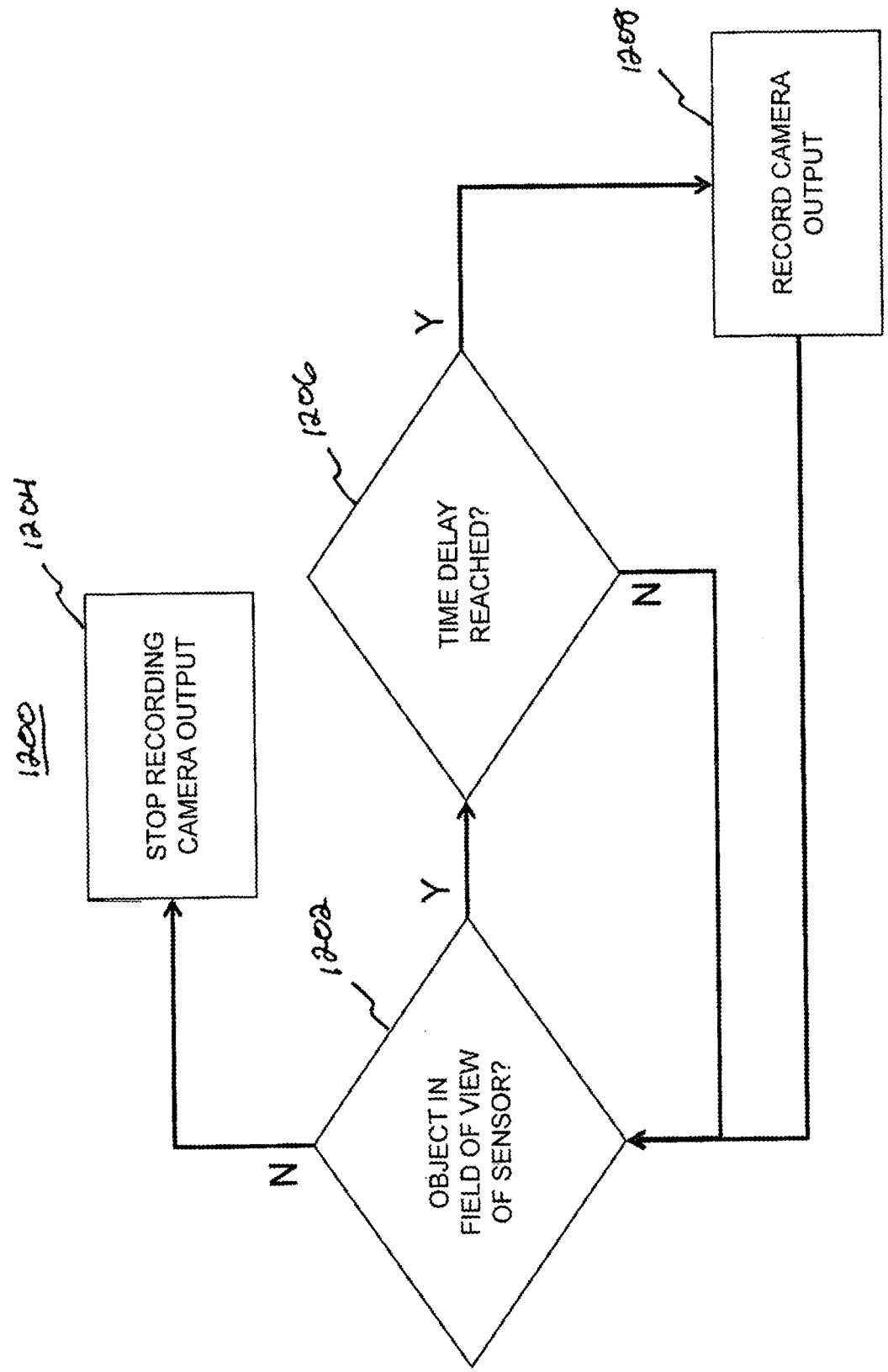
FIG. 12 is a flow diagram of an illustrative collision recording process.

With regard to FIG. 12, a flow diagram of an illustrative collision recording process 1200 is shown. The process 1200 may start at step 1202, where a determination as to whether an object is in a field-of-view of a sensor of an ECV may be made. If it is determined that no object is in a field-of-view of one or more of the ECV sensors, then the process may proceed to step 1204, where recording of video images from a camera on the ECV may be stopped, not started, or not saved. That is, if no collision is determined to be impending, then video images may not be recorded as the potential for a collision is minimal based on not sensing any objects by the ECV sensor(s). Alternatively, if a determination is made that there is an object in a field-of-view of one or more of the sensors, then the process 1200 may proceed to step 1206.

At step 1206, a determination may be made as to whether a time delay has been reached. The time delay may be used to determine whether an object remains in the field-of-view of a sensor. If the time delay has been reached, then video being captured by a camera may be recorded to capture video of an object that has the potential of being struck by the ECV. If the time delay is determined not to have been reached, then the process 1200 may return to step 1202. The use of the process 1200 to capture video of objects that may be struck may be used for safety and liability purposes. It should be understood that the process 1200 is illustrative, and that alternative processes for determining when to capture and not capture video for use in collision review may be utilized. For example, video capture may be performed any time that an object is determined to be in the field-of-view of one of the sensors of the ECV, especially the front sensor(s) of the ECV, and if a collision is determined not to have occurred as a result of the object no longer being in the field-of-view of the sensor(s), then the recording of the video content, which may also include audio, may be deleted, thereby preserving memory. The process 1200 may operate as a "black box" to enable investigators, operators, and users to view collisions that occur to determine whether or not the user was at fault, pedestrian was at fault, and/or equipment of the ECV was at fault, for example.

Figure 13:
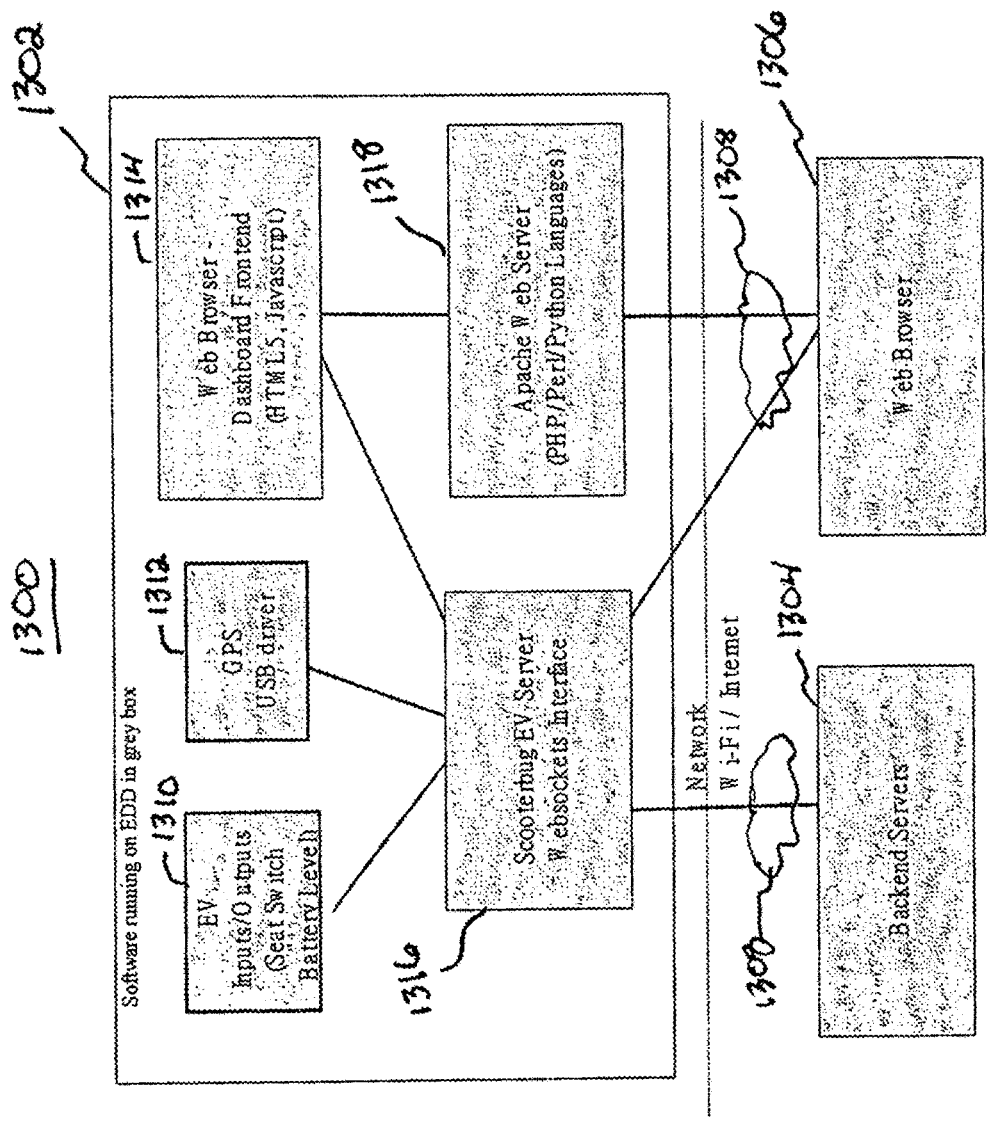
FIG. 13 is an illustration of an illustrative block diagram of a system including software configured to be executed by a CCU of an ECV, and further configured to communicate with server(s) and web browser through one or more communications networks.

With regard to FIG. 13, an illustration of an illustrative block diagram of a system 1300 including software 1302 configured to be executed by a CCU of an ECV, and further configured to communicate with server(s) 1304 and web browser 1306 through communication network(s) 1308 is shown. The software 1302 may include an electric vehicle socket 1310 for handling inputs/outputs from sensors so as to monitor the sensors, battery voltage level, and/or other devices operating on the ECV. A GPS USB driver 1312 may be configured to collect GPS data from a GPS device and communicate that device to an a backend server 1304. A web browser-dashboard front-end software module 1314 may be configured to provide a user interface for a user to operate the CCU. The web browser-dashboard front-end may be written in any language, such as HTML5, Javascript, or otherwise.

To communicate information collected by the software components or modules 1310, 1312, and/or 1314, a CCU server websockets interface 1316 may operate to interface and communicate data over the network 1308. The network 1308 may be a Wi-Fi network and/or any other local or long-distance communications network that supports communication of data over the Internet or other communications network. In an embodiment, a web server, such as Apache web server, that supports various computer languages, such as PHP, Perl, Python, or other language that may be executed on the CCU may be executed by the CCU.

Figure 14:
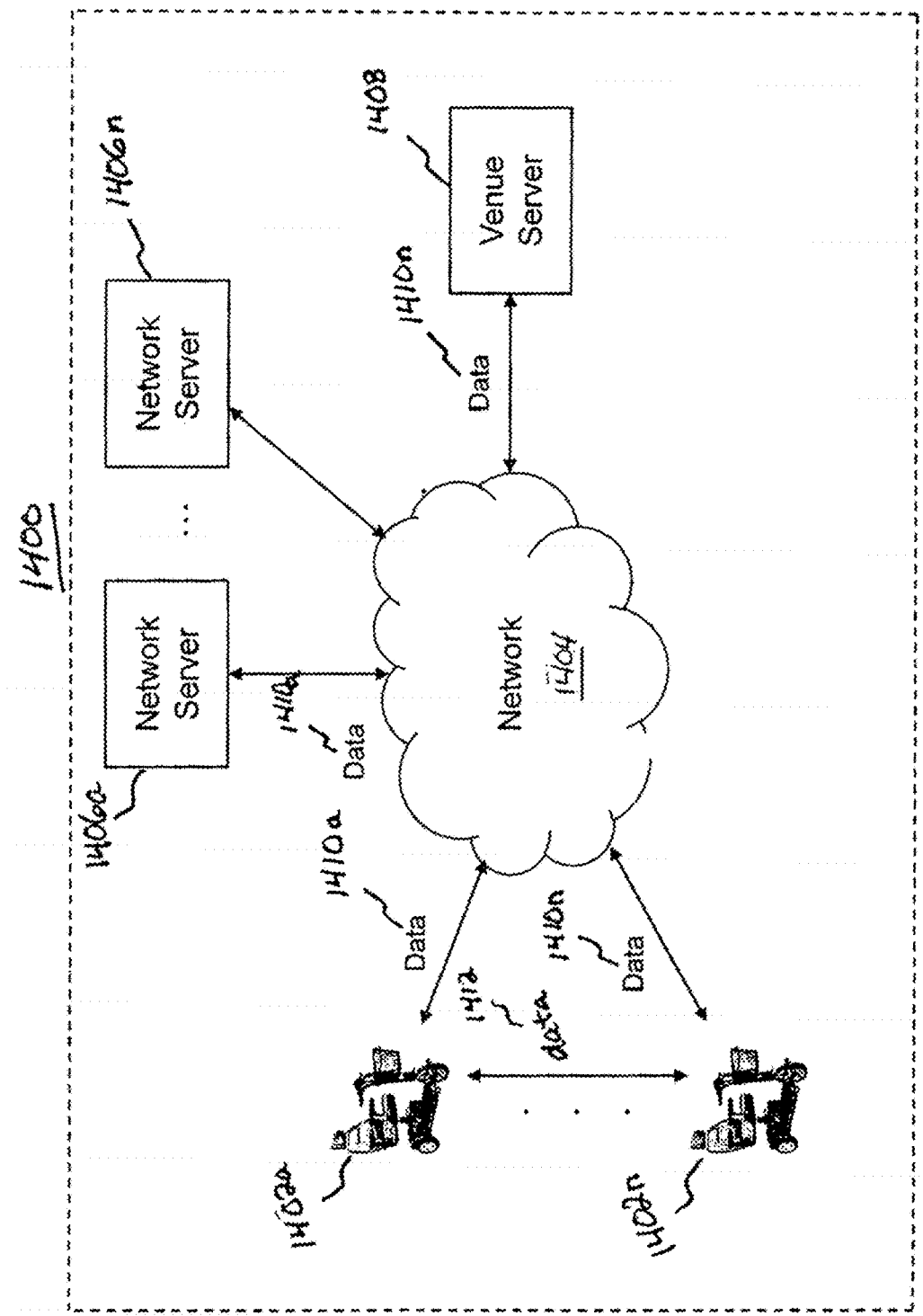
FIG. 14 is an illustration of an illustrative network environment in which electric convenience vehicles are operating.

With regard to FIG. 14, an illustration of an illustrative network environment 1400 in which electric convenience vehicles 1402a-1402n (collectively 1402) are operating is shown. The network environment 1400 may include a communications network 1404 in which network servers 1406a-1406n (collectively 1406) and/or venue server 1408 may be used for communications of control signals and/or content with the ECBs 1402. The network servers 1406 may be used for providing certain types of services, such as location-based services (e.g., mapping services within a larger venue, such as an amusement park or hospital complex).

The venue server 1408 may be utilized for providing venue-specific informational services, such as providing venue-centric directional information (e.g., mapping directions within an amusement park, out-of-bounds messages if the ECV is close to being in restricted or off-premises locations, etc.), video content, interactive content (e.g., games, trivia, maps, etc.), current attractions listing, notices, entertainment listing, venue-specific gaming content, broadcast messages (e.g., emergency messages, weather messages, event messages, closing time, etc.) or other venue-specific information that may be interesting to users of the ECVs 1402. As shown, data 1410a may be communicated between an ECV 1402a and network server 1406a, and data 1410n may be communicated between ECV 1402n and venue server 1408 via the network 1404. In addition, data 1412 may be communicated between and among any of the ECVs 1402. The data that is shared between the ECVs 1402 may include various types of information that may be or may not be accessible to users of the ECVs 1402 using the CCUs to provide control of the ECVs 1402 and provide information to users of the ECVs 1402. In an embodiment, the information may be venue-specific information, such as a cartoon character who operates as a guide or provide venue-centric information. In an embodiment, a video overlay over a map may be used to display the cartoon character continuously or intermittently.

Figure 15:
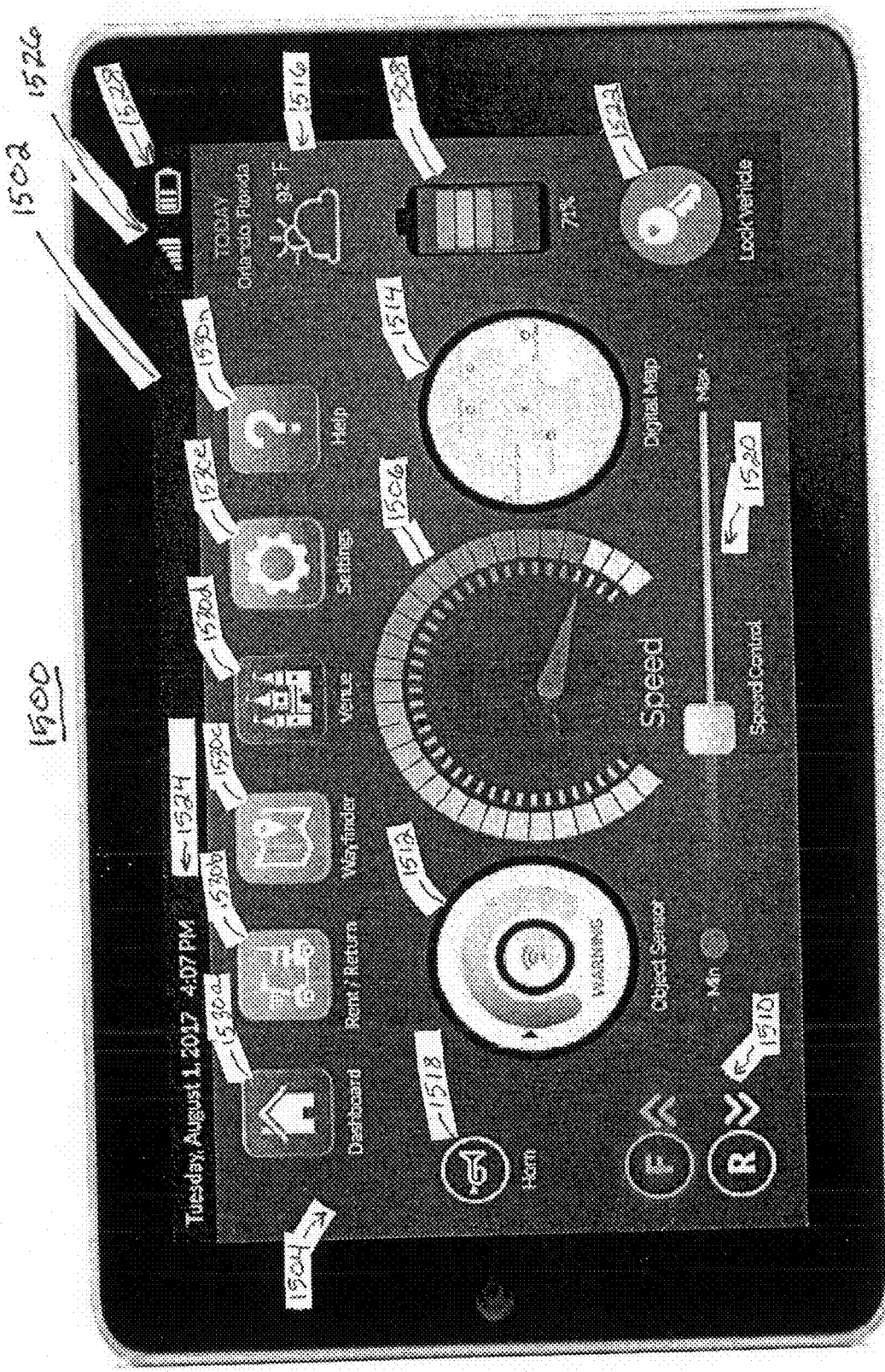
FIG. 15 is an illustration of an illustrative CCU operating on an ECV.

With regard to FIG. 15, an illustration of an illustrative CCU 1500 operating on an ECV, such as shown in FIG. 1A, is shown. As with FIG. 5, the CCU 1500 may include an electronic display 1502 on which a user interface 1504 is displayed. The user interface 1504 includes the same dashboard-type features as FIG. 5, including a speedometer 1506, fuel gauge 1508, in this case a battery charge level, and forward/reverse indicator 1510 to indicate a throttle position to a user. Other information elements, including an object sensor meter 1512, digital map 1514, weather information 1516, horn 1518, speed control limiter 1520, and lock vehicle soft-button 1522. Current time and date 1524 may also be displayed.

Because the CCU 1500 may be wirelessly connected to a communications network, a connection strength indicator 1526 and battery level 1528 may also be displayed.

The CCU 1500 is meant to provide for both ECV control and information for a user. As such, the CCU 1500 may be configured to execute a variety of applications or apps to support ECV and information. The apps may be accessed via app icons 1530a-530n (collectively 1530) by a user to execute the corresponding app. The apps may include Dashboard 1530a, Rent/Return 1530b, Wayfinder 1530c, Venue 1530d, Settings 1530e, and Help 1530n. It should be understood that additional or alternative apps may be executed by the CCU 1500 and be available for execution thereby. Various aspects of the apps are further described herein.

A settings app 1530e may provide for control of language, volume, brightness of the CCU. Also available may be an administrator access using an administrator keycode to access various information and data, such as control of the ECV, inventory availability, etc. Maintenance of the CCU and ECV may also be available by using an administrator or maintenance keycode to provide links to vehicle data and database on the ECV or located on an ECV remote database.

The Dashboard app 1530n operates to display ECV operational information, as shown in the user interface 1504, including the speedometer 1504, object sensor meter 1512, digital map 1514, fuel gauge 1508, and forward/reverse indicator. It should be understood that additional and/or alternative elements and representations of the elements may be utilized. For example, rather than using dials, bars, digits, or other graphical representations may be utilized to represent speed, levels, distances, and so on.

Selection of the Rent/Return app 1530b cause the user interface 1504 to change to user interface(s) that allow for a user to initiate or complete a rental process directly via the CCU. By allowing for rental directly from the CCU, users do not have to rent via another device, such as a mobile telephone, kiosk, or otherwise. A process and user interface screens of the Rent/Return app 1530b are shown in further detail with regard to FIGS. 17A-17C and 18A-18G.

The Wayfinder app 1530c may provide for venue-specific mapping directions and information on a map of a venue. The Wayfinder app 1530c may utilize geolocation data to display current location of a user on top of a venue layout to assist a user with directions. The app 1530c may also provide for audio directions for the user, which may be played via a speaker or earphones if the user is using earphones to listed to audio played via the CCU for audible directions or other content. The Wayfinder app 1530c may further provide for searching for locations, such as restrooms, specific food type restaurants, specific rides, or otherwise, if in an amusement park. Other types of information may be provided for different venues. For example, a tour guide process in which location tracking and audio/visual content may be delivered to the CCU as the user drives his or her ECV at the venue.

The Venue app 1530d may provide information associated with the venue or operator of the venue, such as providing a link to a website of the venue, specific visitor/guest functional tools, or otherwise. In an embodiment, available content, such as video entertainment, such as short features, tour information, movies, or audio (e.g., music, announcements) may be selectably downloaded and watched and/or listened to by a user of the CCU.

The Help app 1530n may provide users with additional "How To's" along with video tutorials, including instructions and illustrations. Direct live, audio-visual assistance may also be available to the user via the Help app 1530n.

Figure 16:
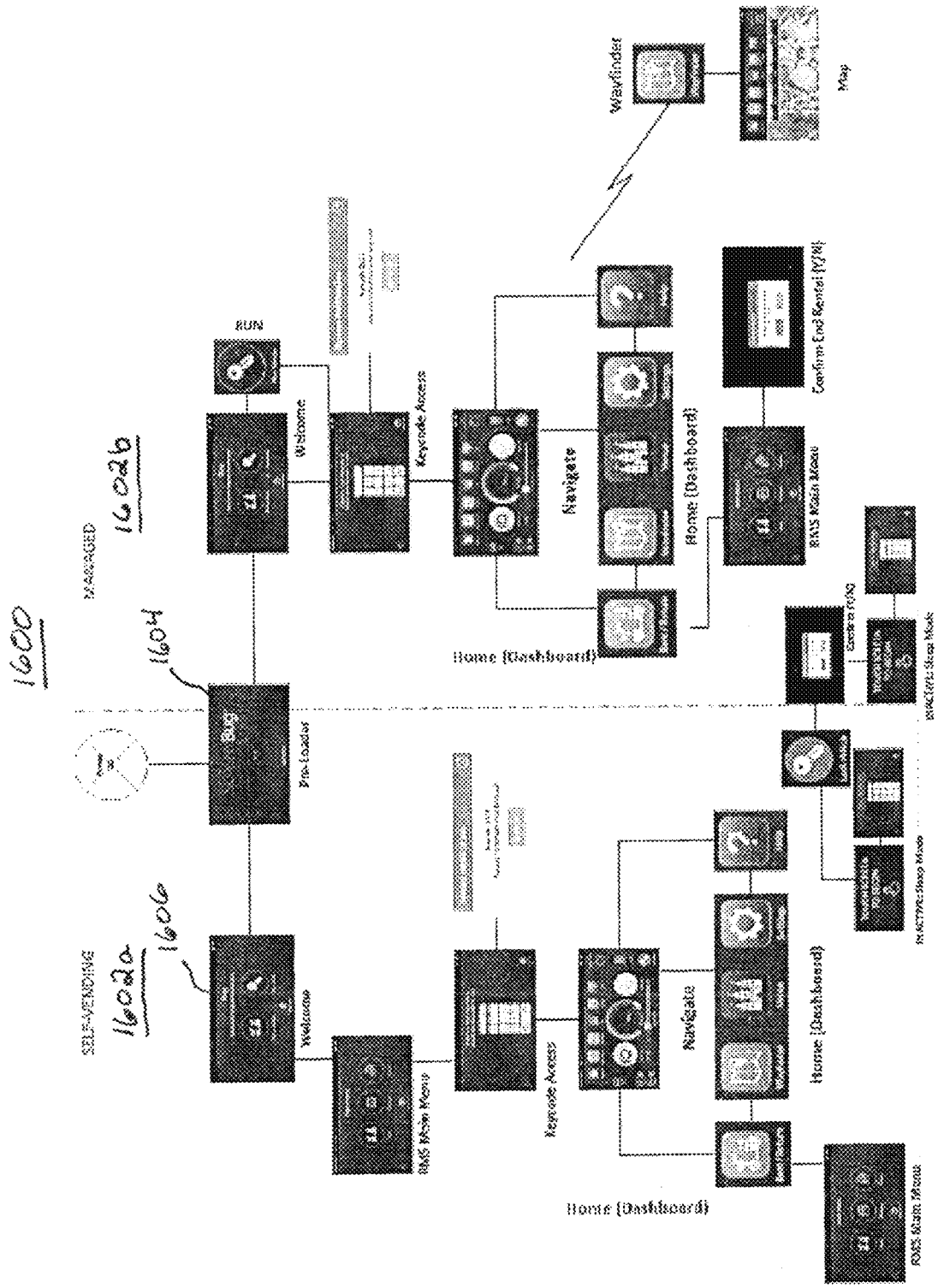
FIG. 16 is a hierarchy of screenshots that represent software operation of a CCU.

With regard to FIG. 16, a hierarchy of screenshots 1600 that represent software operation of a CCU is shown. The hierarchy 1600 includes two possible CCU engagement options, including a self-vending process 1602a and a managed process 1602b. Each of the different engagement options may provide for the same or similar functionality, but the self-vending option may provide user interface screens that enable the user to rent the ECV via the CCU. The different modes of operation may depend on how different venues want to operate the ECVs and types of uses of the ECVs. For example, if the ECVs are to be used as a utility vehicle in a hospital, use of the ECVs by patients or visitors may be free or otherwise accommodated for by the hospital.

Figure 17A:
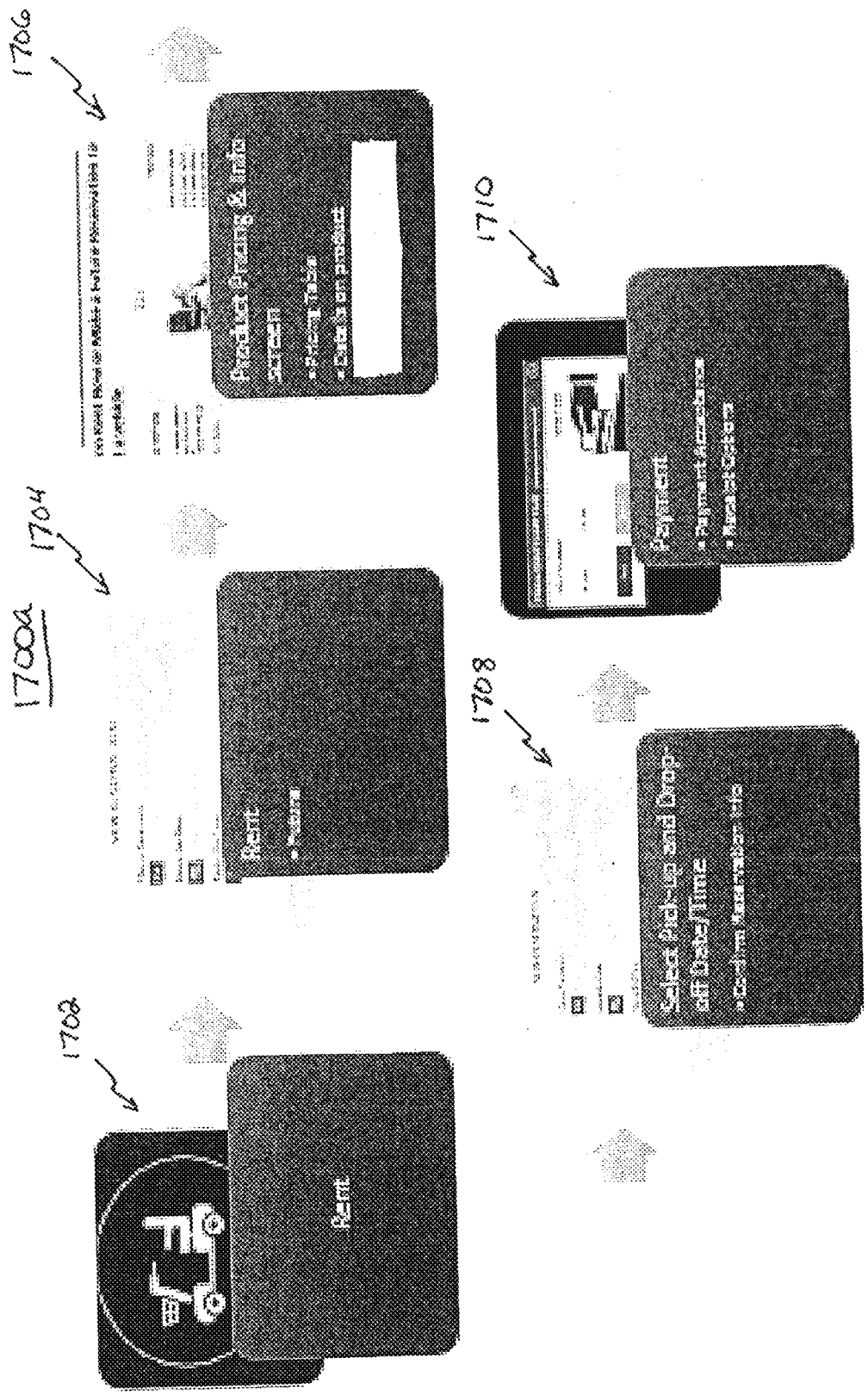
FIGS. 17A-17C are a sequence of an illustrative process that enables a user to rent and access an ECV.
Figure 17B:
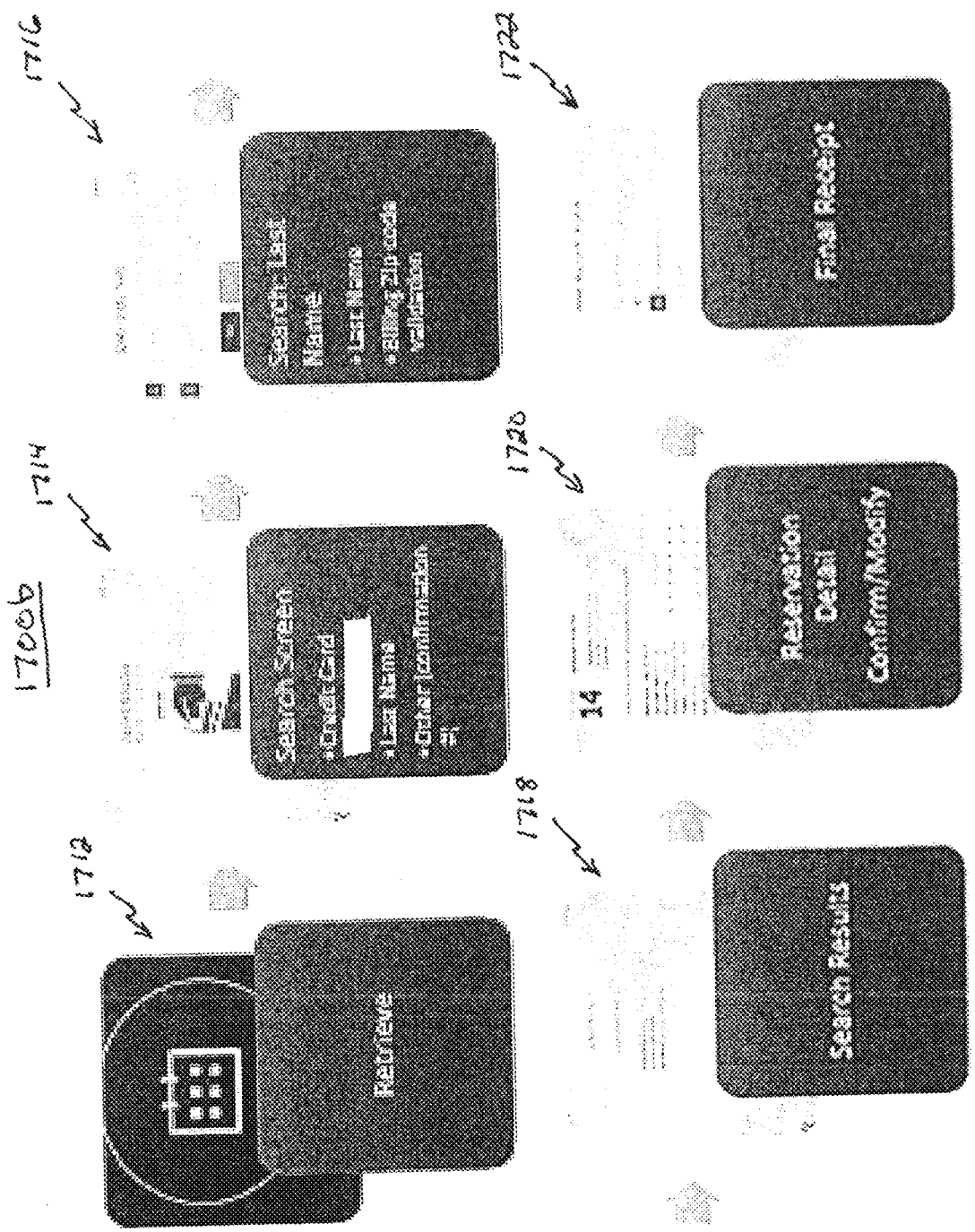
Figure 17C:
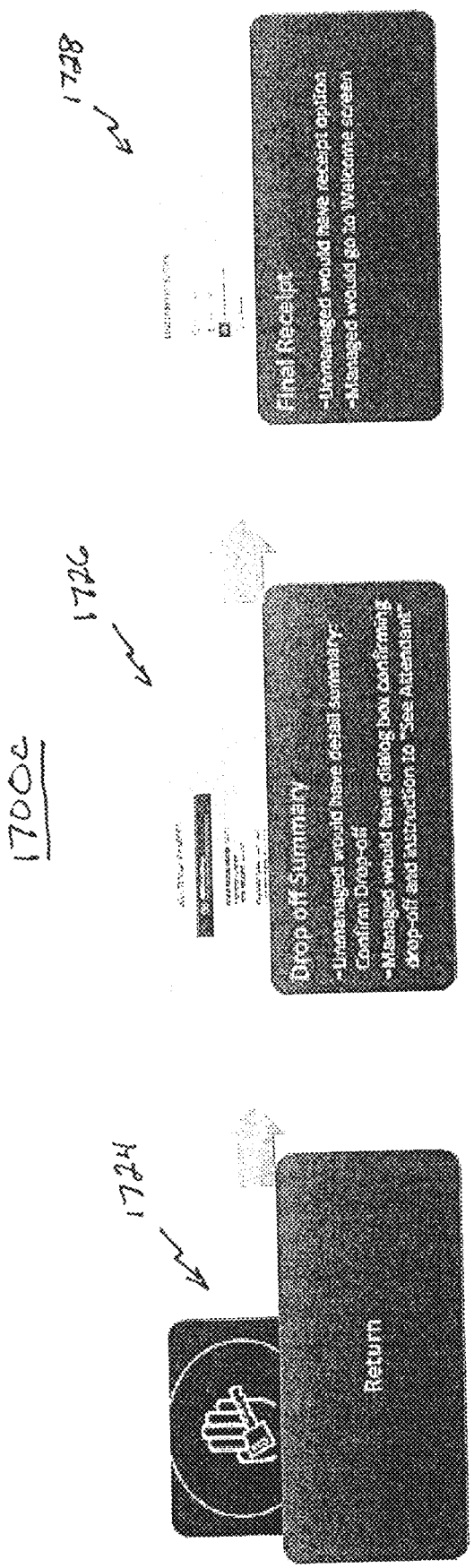

With regard to FIGS. 17A-17C, a sequence of an illustrative process 1700a-1700c (collectively 1700) that enables a user to rent and access an ECV is shown. The process 1700 may start at step 1702, where a user may select to rent an ECV. At step 1704, a new reservation request may be made, which may lead to displaying a product and pricing listing at step 1706. The product and pricing information may include one or more ECV products and pricing for rentals of the respective ECV products. The ECV products may include different options, such as sitting or standing, basket, lockbox, or other options of ECV configurations. The reservation request may include immediate rental or establishing a future rental date and time to pick up and drop off the ECV at step 1708. At step 1710, payment information may be submitted and approved for rental of the ECV.

The process 1700 may continue at step 1712, where the user may select to retrieve a previously rented ECV or retrieve rental time information, such as a future rental that the user request to rent the ECV. In an embodiment, if the user made a previous online reservation of an ECV, either a particular ECV may be reserved for the user or the user may be able to select an available ECV and enter a reservation number or user ID to initiate a rental period for the assigned or selected ECV. At step 1714, a search screen may be displayed, where the search screen may include a credit card number, last name, order number or confirmation number, or otherwise. If the user selects to search by his or her last name, the user may enter his or her last name along with a billing ZIP Code for validation. Alternative search imports may be utilized to locate an order associate with a user, as well.

At step 1718, search results may be displayed. The search results may include date and time of the rental, which may be displayed at step 1720. Reservation details, such as ECV type, identifier number of the ECV, or otherwise may also be displayed. In addition, step 1720 may enable the user to confirm and modify a reservation of the ECV. At step 1722, a final receipt may be provided to the user for having confirmed payment for rental at a present or future time.

With regard to FIG. 17C, at step 1724, a user may select to return the ECV. In response, as step 1726, a drop-off summary may be displayed on the CCU for the user. If the drop-off is performed in an unmanaged environment, then a detailed summary may be provided along with a confirmation of the drop-off. In a managed environment, the ECVs have managed rental and payment services with an attendant, and a dialog box confirming drop-off with an instruction to see an attendant may be provided. At step 1728, a final receipt may be provided to the user. The final receipt may be emailed, printed by or remotely from the ECV, or otherwise communicated to the user, if the user so desires. After final receipt is provided, the CCU may return to an initial welcome screen so that the ECV may be available for another user to rent or use.

Figure 18A:
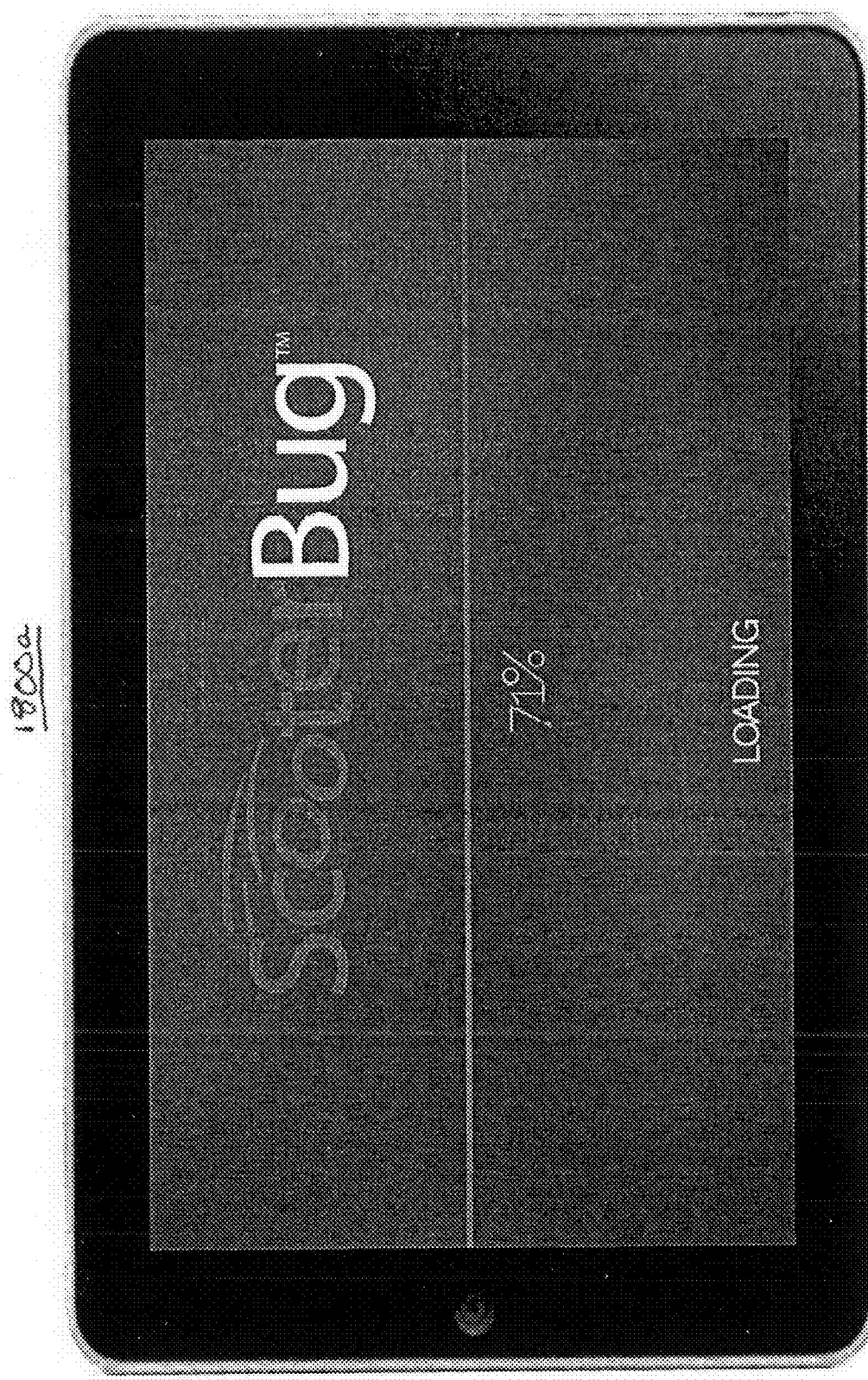
FIGS. 18A-18G are screen shots of an illustrative user interface of a CCU that supports rental and usage of an ECV.

With regard to FIGS. 18A-18G, screen shots of an illustrative user interface of a CCU that supports rental and usage of an ECV are shown. In FIG. 18A, an illustrative user interface 1800a is a illustrative loading screen that indicates to an operator that the CCU software is loading into memory and a processor of the CCU. As shown, as the CCU software is loading, a percentage of the amount complete, in this case 71%, may be shown to provide an operator with a status of the software loading process.

Figure 18B:
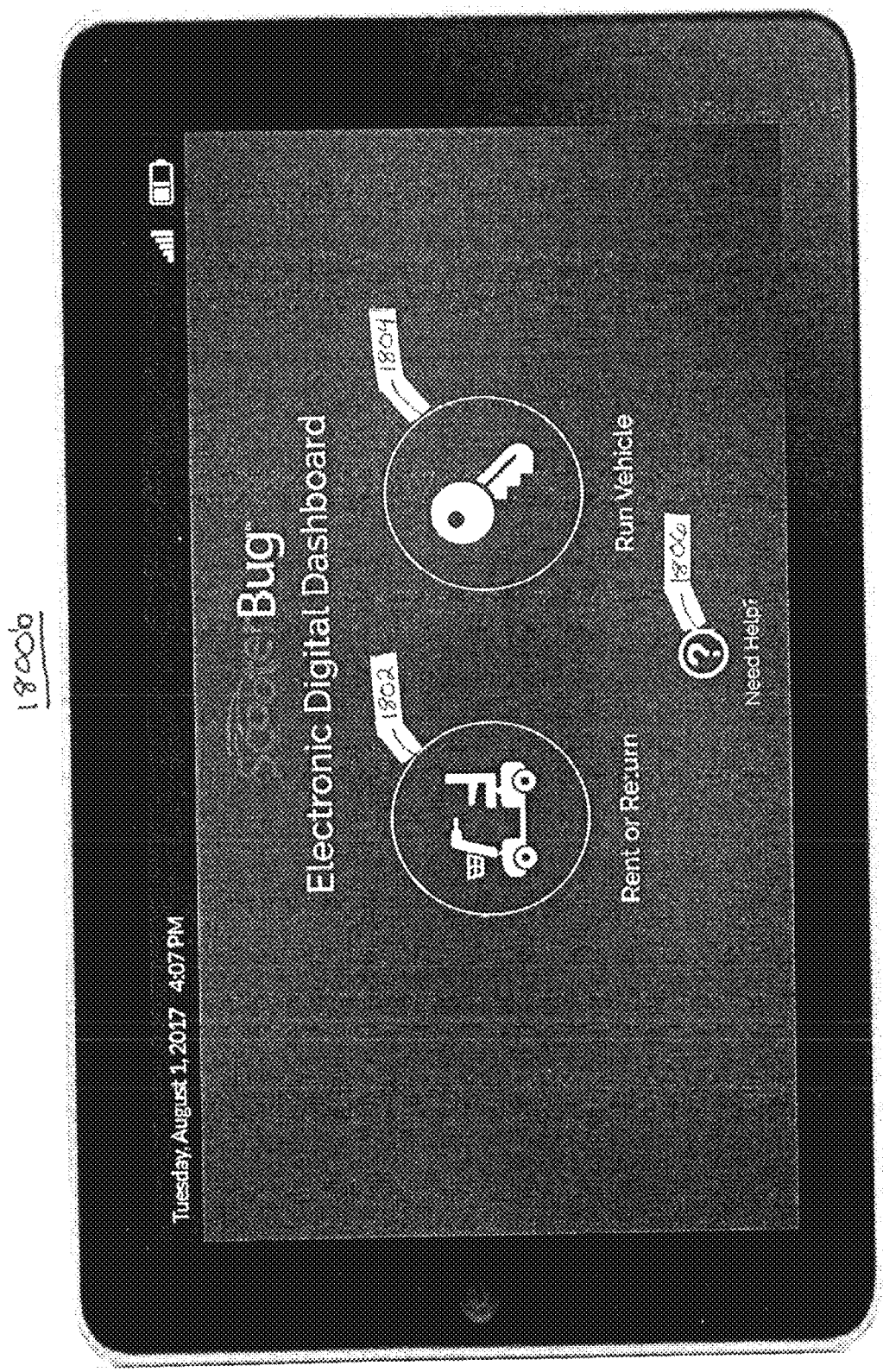

With regard to FIG. 18B, an illustrative user interface 1800b showing two options for the ECV to be operates are shown. A first option is a Rent or Return option 1802 in which the ECV is available for rental to potential renters. If the user is not currently renting the ECV, then the user may select to rent the ECV. If the user is currently renting the ECV, then the user may select to return the ECV to stop the rental process and allow others to rent the ECV. A second option 1804 may allow for a current user/renter of the ECV to start running the ECV. Alternatively, the second option 1804 may allow for the ECV to be used without having to be rented, such as in a tour group. A help option 1806 may be selected to provide help information to a user or potential user, where the help information may include pricing information, operation information, or any other information in a list or search format, for example, of the ECV.

Figure 18C:
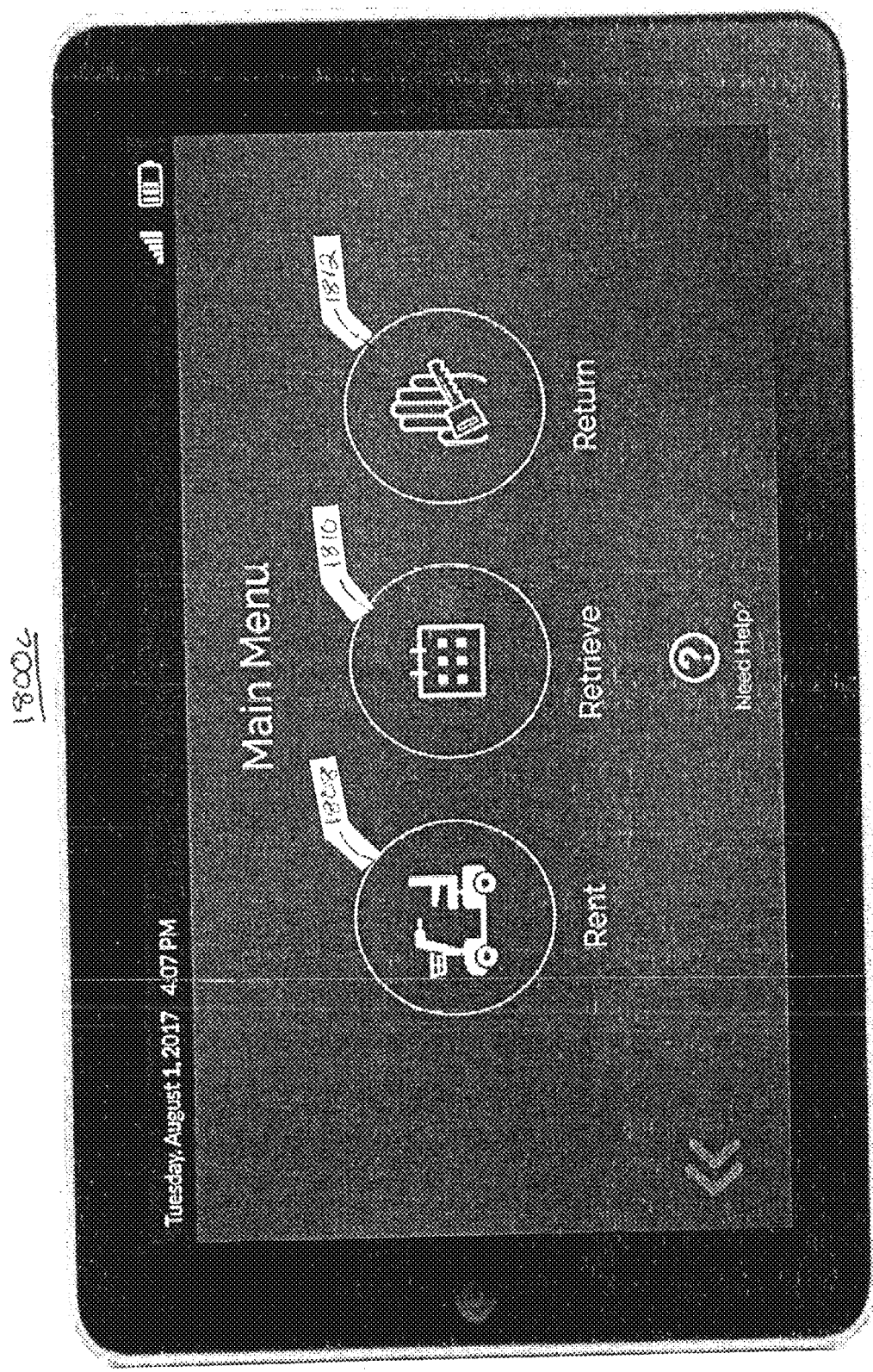

With regard to FIG. 18C, a screenshot of an illustrative user interface 1800c of a CCU that enables users or potential users to rent, retrieve, or return an ECV is shown. A rent soft-button 1808 may allow for a potential user to initiative a rental process to rent the ECV. The rental of the ECV may be performed directly on the ECV, thereby allowing for users to rent the ECVs without having to go to a central rental kiosk that, if busy, will create a line and limit rental desires of users. That is, having the rental capability directly on the ECV, the users may more efficiently rent the ECVs. Moreover, by providing rental capabilities without having to use a mobile device, such as a smartphone, anyone with or without a personal mobile device may be able to rent the ECVs. A retrieve soft-button 1810 may allow for a user to determine a prescheduled date and time of rental. A return soft-button 1812 may allow for a user to return the rented ECV. In returning the ECV, the return may be made by simply selecting to return the ECV by pressing the Return soft-button 1812 and going through a checkout process (e.g., confirmation screen, payment identification screen, and receipt screen).

Figure 18D:
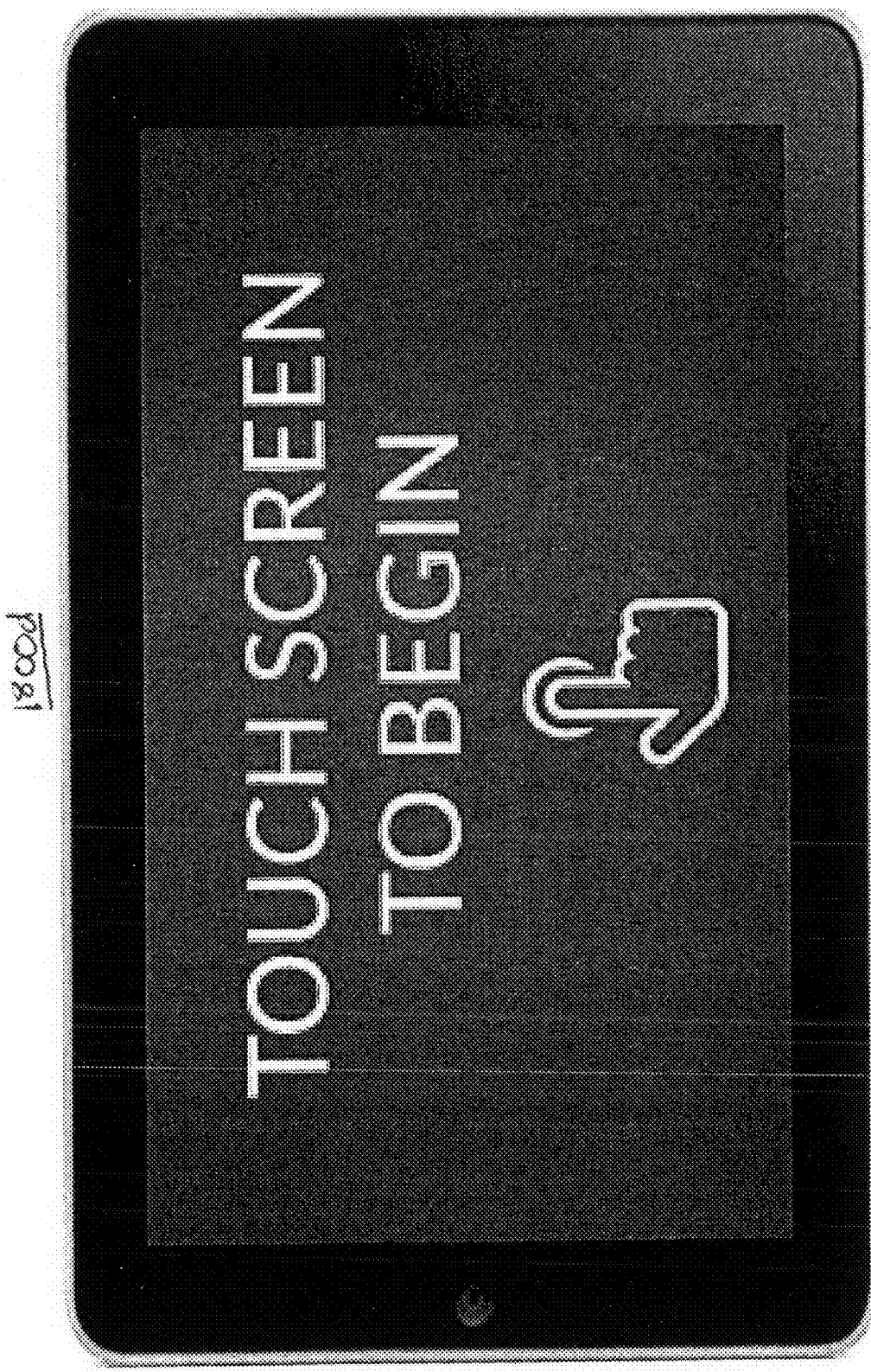
Figure 18E:
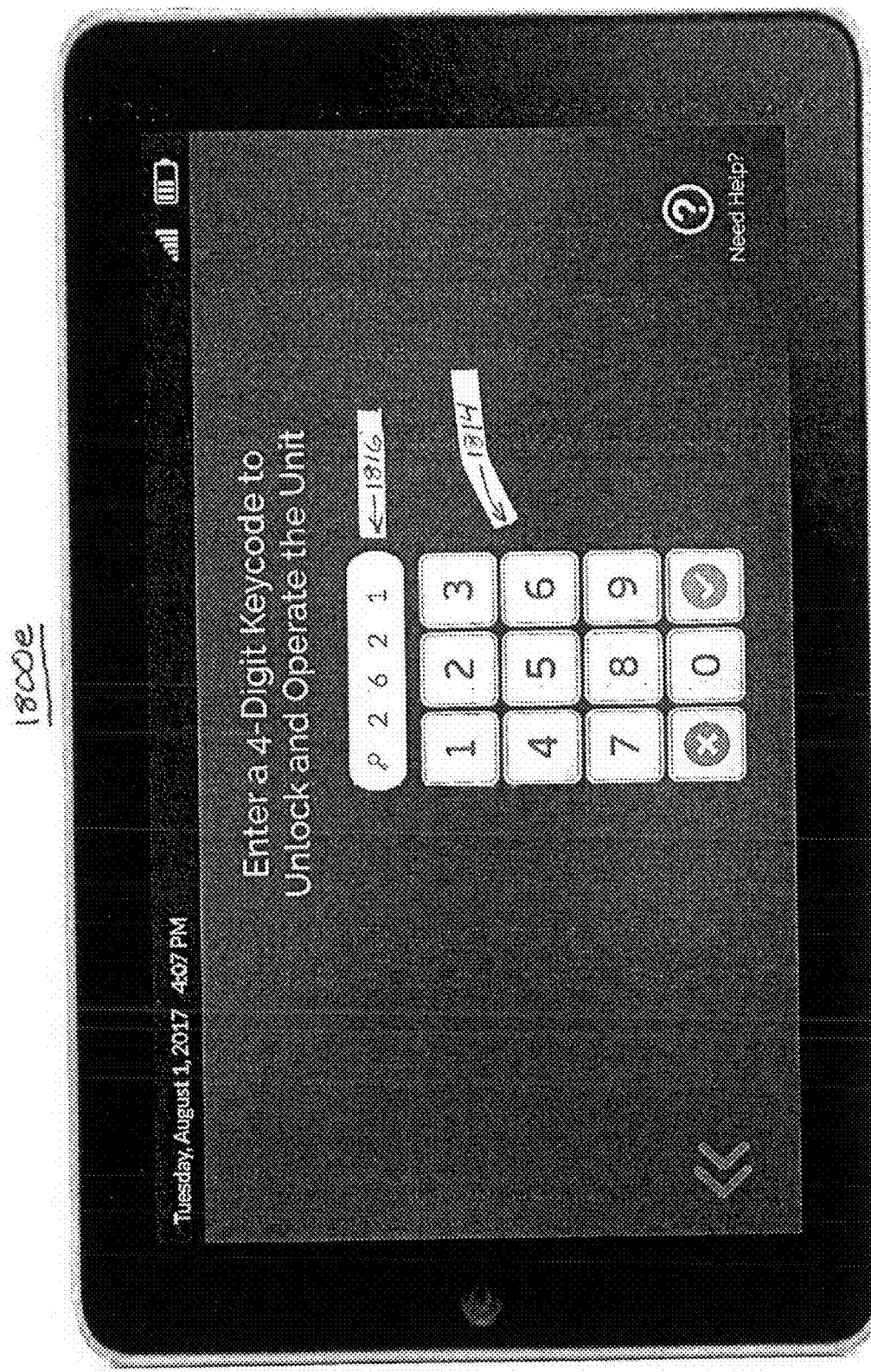

With regard to FIG. 18D, an illustrative user interface 1800d that may operate as a sleep-mode screen displayed prior to or during rental of the ECV being rented is shown. In response to a user touching the screen, the rental process or continued operation process may begin, as provided in FIG. 18E. As shown in FIG. 18E, an illustrative user interface 1800e is shown to include a soft-keypad 1814 via which a user may type a keycode, such as a 4-digit keycode, to be used to lock and unlock the CCU of the ECV. The keycode may be displayed in a text field 1816 as the user is typing his or her keycode. In an alternative embodiment, a keycode may be generated and assigned to the user for use with the CCU of the ECV. In an embodiment, the numbers may be temporarily displayed and then masked by an asterisk or other character to limit the ability for others to see the keycode. Thereafter, if the user stops using the ECV for a period of time, such as 5 or 10 minutes and a sleep-mode screen is displayed, the user may be asked to enter his or her keycode to re-access the CCU to operate the ECV.

Figure 18F:
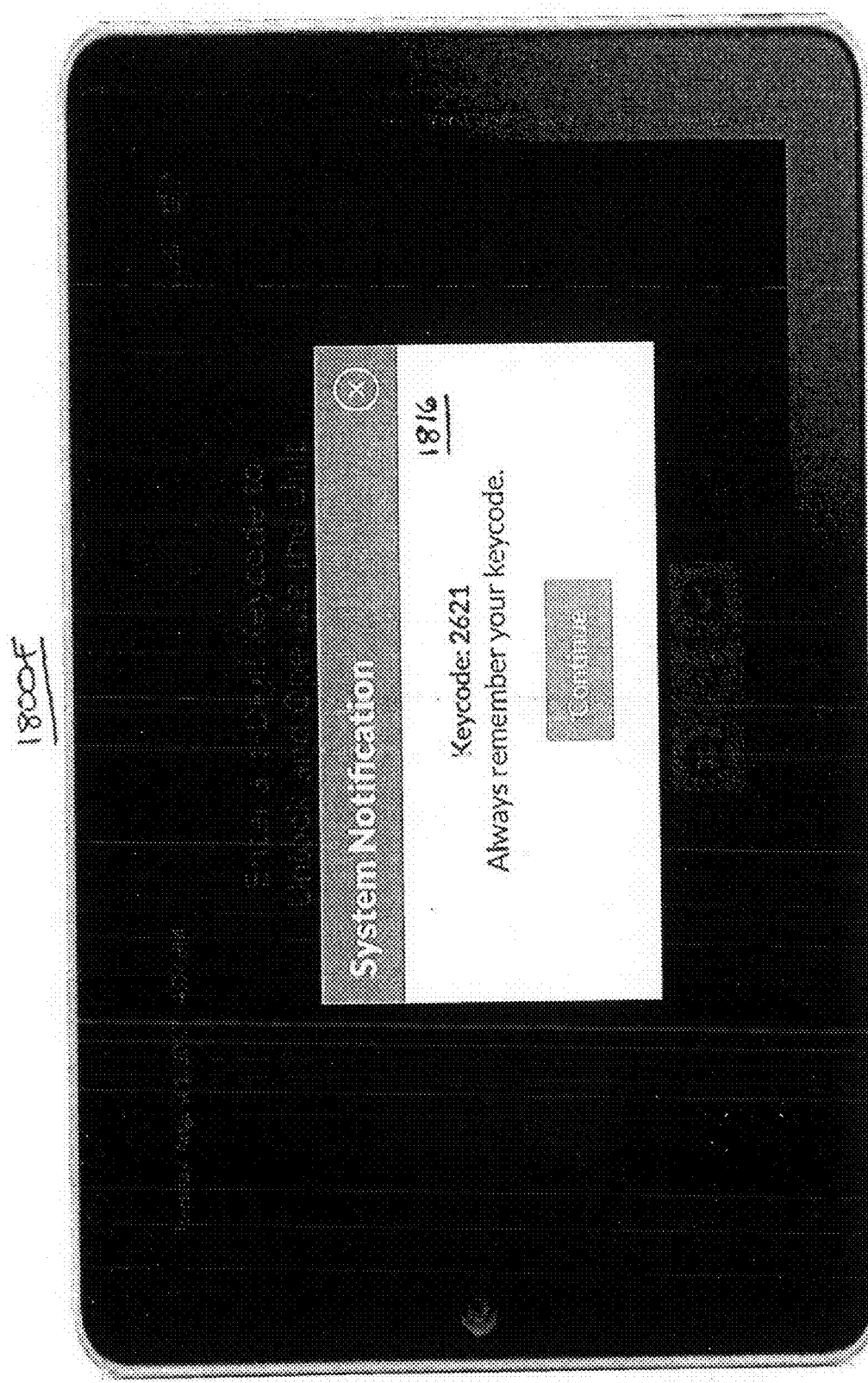
Figure 18G:
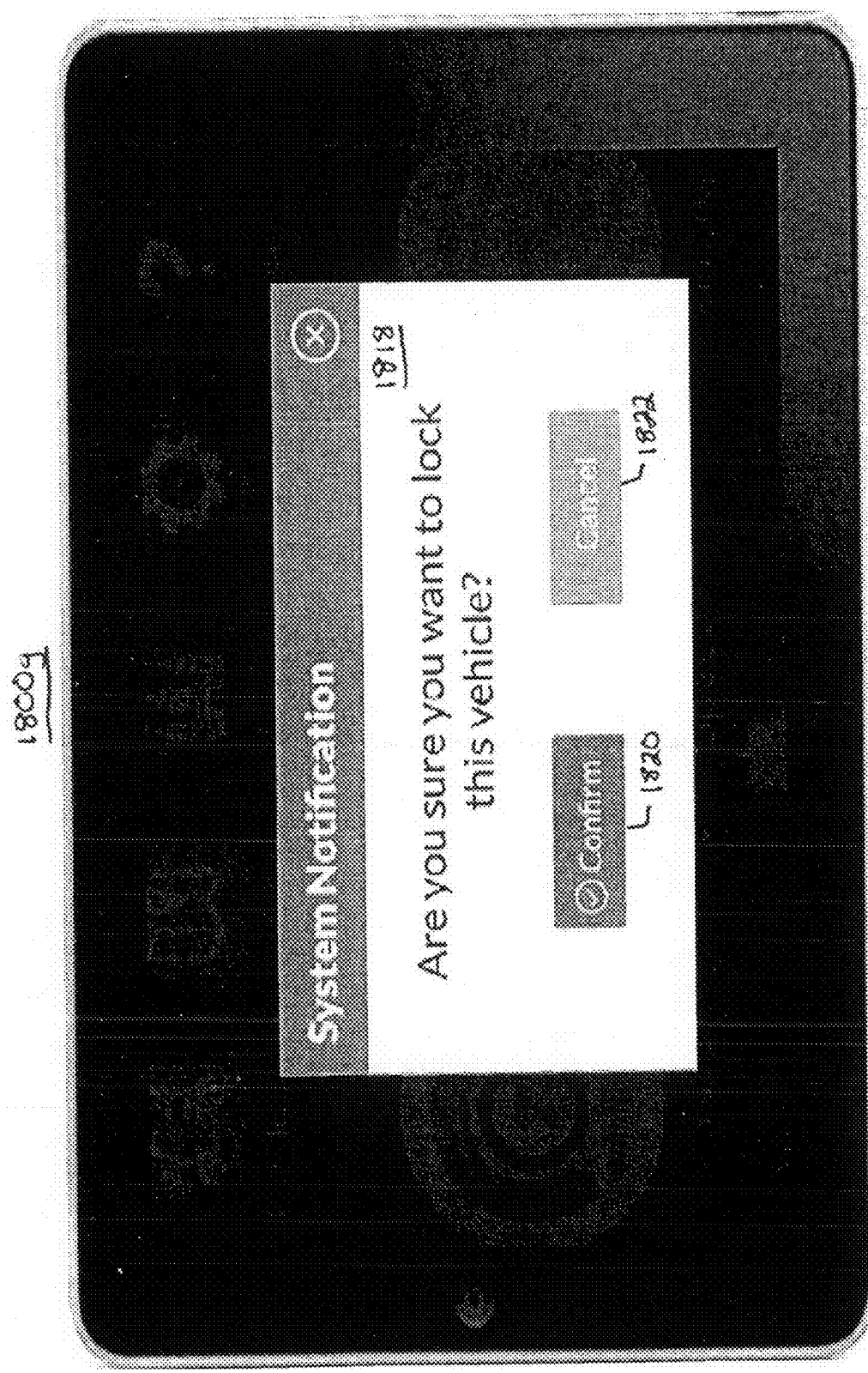

In FIG. 18F, an illustrative user interface 1800f may display an illustrative pop-up notification 1816 that displays the keycode with a message to remind the user to remember his or her keycode for later use to unlock and access the CCU for operation of the ECV. With regard to FIG. 18G, an illustrative user interface 1800g may be displayed with a system notification 1818 in response to a user selecting to lock the CCU is shown. The system notification 1818 may include a "confirm" soft-button 1820 and a "cancel" soft-button 1822 that allows for the user to confirm or cancel locking the CCU. If the user confirms that he or she wants to lock the CCU, then the user may be requested to re-enter his or her passcode to unlock the CCU.

Figure 19:
FIG. 19 is an illustration of an illustrative venue, in this case an amusement park, in which a rental area with ECVs may be rented.

With regard to FIG. 19, an illustration of an illustrative venue 1900, in this case an amusement park, in which a rental area 1902 with ECVs 1904a-1904n (collectively 1904) may be rented is shown. Once rented, rented ECVs 1906a-1906n (collectively 1906) may travel throughout the venue 1900. The rented ECVs 1906 may be driven around the venue 1900 by the users. In some embodiments, the rented ECVs 1906 may be rented and the rental may be ended anywhere in the venue 1900 without having to be returned back to the rental area 1902 as the CCUs may provide for rental at the ECV. In other embodiments, the rentals and termination of rentals have to be performed in the rental area 1902, thereby allowing for venue attendants to more easily manage the ECVs.

Figure 20:
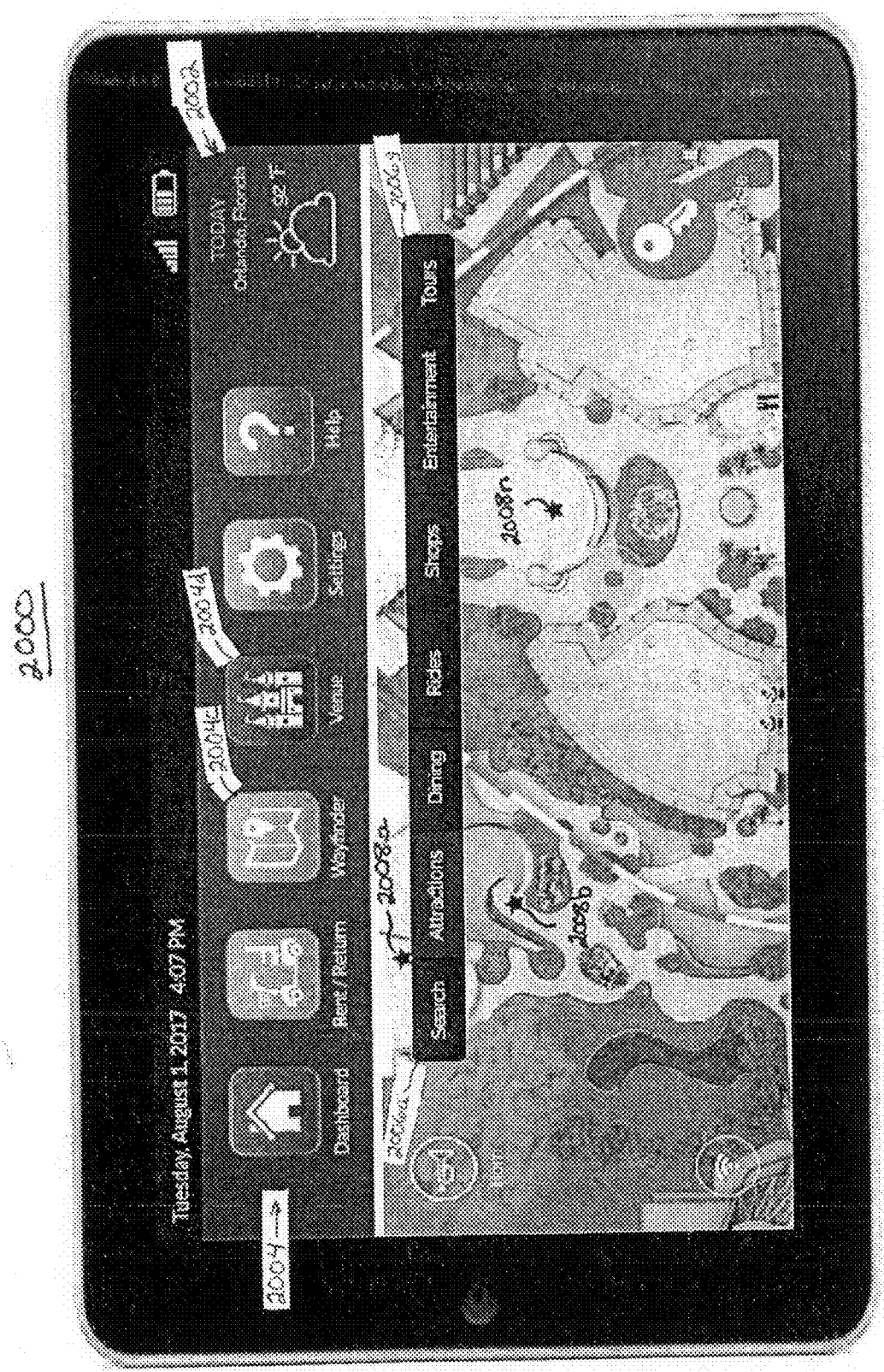
FIG. 20 is an illustrative CCU that displays a user interface with which a user of an ECV.

With regard to FIG. 20, an illustrative CCU 2000 that displays a user interface 2002 with which a user of an ECV is shown. The user interface 2002 may, provide the user with a number of selectable options 2004, including "Dashboard" option, "Rent/Return" option, "Wayfinder" option, "Venue" option, "Settings" option, and "Help" option. In response to the user selecting the "Wayfinder" option 2004c, a map of the venue may be displayed with a number of selectable options 2006a-2006g (collectively 2006) for a user to select for accessing information associated with the venue. The options may include a "Search" option 2006a, "Attractions" option 2006b, "Dining" option 2006c, "Rides" option 2006d, "Shops" option 2006e, "Entertainment" option 2006f, and "Tours" option 2006g, for example.

Selection of the "Search" option 2008a may be selected to enable a user to search for information associated with the venue. The information may be limited to locations, such as rides, restaurants, and attractions at the venue, or may be used to search for content, such as videos associated with the venue. In response to the search, information, such as names and/or images of locations or content may be selectably displayed to enable a user to read, view, and/or select for additional information to be downloaded, displayed, and/or highlighted on the map.

Selection of the "Attractions" option 2008b may cause images and/or highlights of attractions 2008a-2008n (collectively 2008) to be displayed on the map. The user may be able to touch or otherwise select the attractions on the map to be provided with additional information of the selected attractions, such as times of operation, current wait time, height requirements, and so on. In addition, directions to a selected attraction may be provided to the user via the user interface 2002. In an embodiment, the directions may factor in time of day to determine the directions. For example, if the time of day is around lunchtime, then the directions may include a pathway that passes one or more restaurants in an effort to have the user of the ECV stop at a restaurant. If the time of day is mid-afternoon, then the directions may include passing by one or more gaming area in an attempt to encourage the user to stop and play games, thereby possibly earning revenue for the venue. Other factors, such as traffic along a route, age of the user and/or individuals associated with the user, or otherwise, for determining directions to an attraction may be factored into determining directions. The CCU may include geolocation capabilities to assist with providing directions for the user via the user interface 2002. In an embodiment, the directions may be provided in response to selecting the "Wayfinder" soft-button 2004c. The directions, which may include displaying a route line on pathway(s) to the desired attraction, may be displayed to assist a user to travel to the destination location. The "Attractions" soft-button 2008b may also provide for wait times at rides or attractions, and sort the attractions based on wait time and/or distance therefrom optionally to be selectable by a user for directions.

Figure 21B:
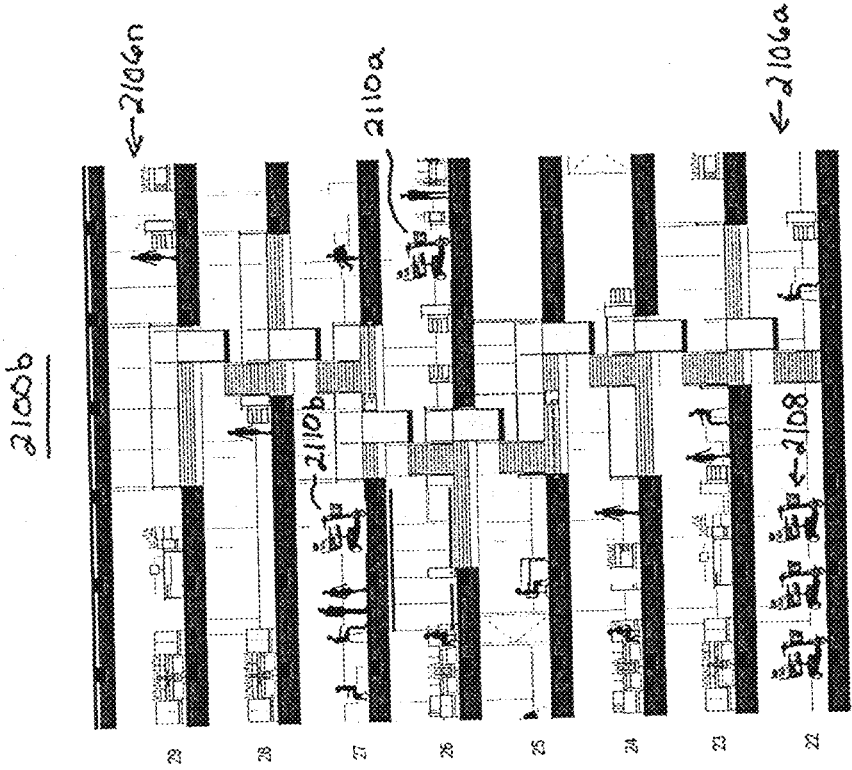
FIGS. 21A and 21B are illustrations of a top view and side view of another venue, in this case a hospital, in which ECVs with CCUs are operating.
Figure 21A:
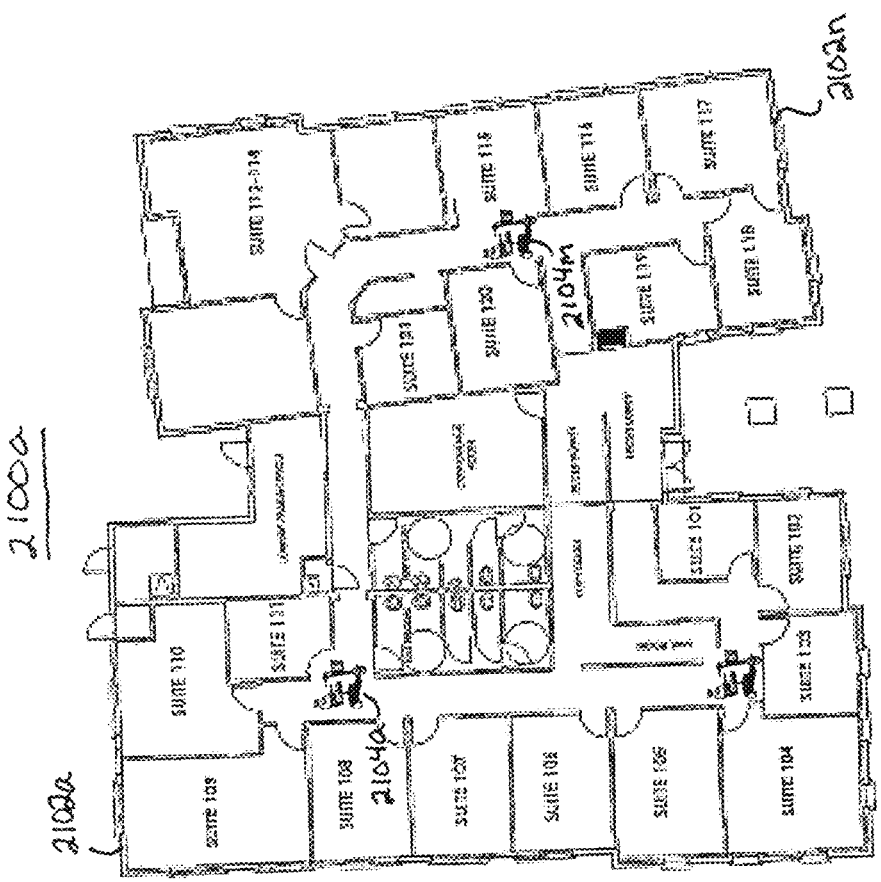

With regard to FIGS. 21A and 21B, illustrations of a top view and side view of another venue 2100a and 2100b, in this case a hospital, in which ECVs with CCUs are operating are shown. The venue 2100a is shown to include multiple suites 2102a-2102n (collectively 2102) on a particular floor. A user interface on a CCU may enable a user to select from amongst floors in which the ECVs may travel to be displayed. Also shown on the floor are a number of ECVs 2104a-2104m (collectively 2104) that are currently located on the floor. In an embodiment, the ECVs 2104 may be displayed in different colors or with different representations to distinguish available ECVs from unavailable ECVs (i.e., currently in-use versus not-in-use ECVs), thereby allowing for a user or potential user to find an ECV to use. The ECVs 2104 may be rentable or freely available for use. A number of floors 2106a-2106n (collectively 2106) may be displayed to show which floors are available for ECVs to be ridden. In an embodiment, a rental area 2108 of rentable ECVs may be shown along with currently rented ECVs 2110a and 2110b shown on respective floors. In an embodiment, the illustrations in FIGS. 21A and 21B may be user interfaces for an operator of the ECVs to manage and track location of the ECVs, where the user interfaces may be available on a computer, mobile device, and/or CCU of an ECV.

One embodiment of a method for operating an electric convenience vehicle may include enabling a user of the ECV to control direction of movement. At least one wheel may be caused to be propelled forward, propelled backward, or to remain in a fixed position in response to the user respectively activating a throttle in a forward position, in a second position, and in an idle position. The user may be enabled to communicate over a communications network via a command and communications unit (CCU).

In an embodiment, the process may further generate sense signals indicative of an object being sensed in response to detecting an object in front of a direction of travel of the ECV, and control movement of the ECV as a function of the sense signals. The process may further include (i) displaying operational and non-operational data of the ECV, (ii) communicating with a communications network, and (iii) limiting the ECV to (1) a first maximum speed when no objects are detected based on the sense signal, and (2) a second maximum speed when an object is detected based on the sense signal. The process, in displaying the operational data, may include displaying speed of the ECV, and where displaying non-operational data includes displaying information associated with a venue in which the ECV is operating. Displaying non-operational data may include displaying venue-centric directional information.

Limiting the ECV to the first maximum speed may include limiting the ECV to a maximum speed that is higher than the second maximum speed. In response to the user rotating a steering mechanism, objects in front of an angle of a front face of the steering mechanism may be sensed. Responsive to sensing an object, recording of images may be initiated, and responsive to the object no longer being sensed, recording of the images may be stopped.

Sensing objects may include sensing objects within a proximity of the ECV. The user may be enabled to request directions within the venue. Moreover, the process may include (i) sensing that the motor is on and that the user transitions from being supported by a user support member (e.g., seat, vertical rest member, bench, standing surface, resting surface) to not being supported by the user support member, and (ii) generating a delay to establish a time period during which a determination as to whether the user is sensed to return being supported by the user support member within the time period before enabling the motor to turn off. The process may further include sensing when the user is being supported by a user support member, and further causing the CCU to enter a sleep mode in response to the sensor not sensing that the user is being supported by the user support member, and preventing the CCU from entering the sleep mode in response to sensing that the user is being supported by the user support member.

The process may further include executing, by the CCU, an application that receives signals from a network server, and further comprising displaying interactive information for the user. The process may further include enabling the user to receive information associated with rental of the ECV from a remote device, the information including a unique identifier that enables the user to access operation of the ECV. The user may further be enabled to rent the ECV directly from the CCU. The user may be enabled to rent the ECV by presenting the user interface via which the user can specify duration of rental, submit payment, and submit a unique identifier. The user may be enabled via the CCU to reserve an ECV at a later time. Images from the ECV may be captured via the user interface.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. An electric convenience vehicle (ECV), comprising:
a frame;
a plurality of wheels configured to support and move the frame;
a user support member supported by said frame at which a user is positioned in operating the ECV;
a steering mechanism disposed toward a front portion of the ECV, and configured to enable the user to rotate direction of at least one wheel to control direction of movement of the ECV;
a motor configured to cause at least one wheel to be propelled forward, propelled backward, or to remain in a fixed position;
a throttle, when activated in a first position, causes said motor to propel said at least one wheel in a forward direction, when activated in a second position, causes said motor to propel said at least one wheel in a reverse direction, and when in a third position, causes said motor to maintain said at least one wheel in a fixed position;
a control and communications unit (CCU) disposed in front of said user support member, and configured to control operation of said motor and to communicate over a communications network;
a ground-facing sensor configured to sense one or more markings positioned on the ground, and wherein said CCU is further configured to cause the ECV to automatically traverse the one or more markings at a predetermined speed;
said CCU further being configured to determine distance from an object in front of the ECV and cause the ECV to move forward in response to the object moving forward, thereby maintaining a predetermined distance from the object moving within an area within which the one or markings are located, the object being a person or another ECV.

2. The ECV according to claim 1, further comprising:
a plurality of sensors directed to detect objects in front of a direction of travel of the ECV, and configured generate sense signals indicative of an object being sensed by said sensors; and
wherein said CCU is further configured to receive the sense signals and to control operations of said motor as a function of the sense signals.

3. The ECV according to claim 2, wherein said CCU includes a processing unit, a non-transitory memory, electronic display configured to display operational and non-operational data of the ECV, and an input/output unit configured to communicate with the communications network, said processing unit configured to execute an ECV control module having a first mode when no objects are detected by said sensors, and a second mode when an object is detected by said sensors as determined by said processing unit based on the sense signals.

4. The ECV according to claim 3, wherein the operational data includes speed of the ECV, and wherein the non-operational data includes information associated with a venue in which the ECV is operating.

5. The ECV according to claim 4, wherein the non-operational data includes venue-centric directional information.

6. The ECV according to claim 3, wherein the first mode enables said motor to operate at a first maximum speed, and the second mode limits said motor to operate at a second, maximum speed that is slower than the first maximum speed.

7. The ECV according to claim 2, further comprising a tiller attached to said steering mechanism on which said sensors are affixed and oriented to face in front of a front face of said tiller, wherein said tiller is configured to rotate in response to the user rotating said steering mechanism, thereby causing said sensors to rotate along with the front face of said tiller.

8. The ECV according to claim 2, further comprising a camera oriented to face forward of the ECV, and, responsive to said sensors sensing an object within sensing proximity of the sensors, automatically initiate recording of images captured by said camera, and responsive to the object no longer being sensed within the sensor proximity of sensors, automatically initiate stopping recording of images by said camera.

9. The ECV according to claim 2, wherein said plurality of sensors include proximity sensors.

10. The ECV according to claim 9, wherein the CCU executes an application that enables the user to request directions within a venue within which the ECV is operating.

11. The ECV according to claim 1, wherein said user support member includes a user support member sensor that senses when the user is supported by said user support member, and wherein said CCU is further configured to:
  sense that the motor is on and the user support member sensor senses that the user transitions from being supported to not being supported by the user support member; and
  generate a delay to establish a time period during which a determination as to whether the support member sensor senses that the user returns to being supported by the user support member within the time period before enabling the motor to turn off.

12. The ECV according to claim 1, wherein said user support member includes a user support member sensor that senses when the user is sitting on said user support member, and wherein said CCU is enabled to enter a sleep mode in response to the user support member sensor not sensing that the user is sitting on said user support member, and prevented from entering the sleep mode in response to the user support member sensor sensing that the user is sitting on said user support member.

13. The ECV according to claim 1, wherein an input/output (I/O) unit of said CCU is in communication with the communications network over which a network server is executing, and wherein said processing unit is configured to execute an application that receives signals from the network server, the application causing said processing unit to display interactive information received from the network server for the user.

14. The ECV according to claim 1, wherein said CCU is further configured to enable the user to receive information associated with rental of the ECV from a remote device, the information including a unique identifier that enables the user to access operation of said ECV.

15. The ECV according to claim 1, wherein said CCU is further configured to enable the user to rent the ECV directly from the CCU.

16. The ECV according to claim 15, wherein enabling the user to rent the ECV includes presenting the user interface via which the user can specify duration of rental, submit payment, and submit a unique identifier.

17. The ECV according to claim 15, wherein said CCU is further configured to enable the user to reserve an ECV at a later time.

18. The ECV according to claim 1, further comprising a camera disposed on the ECV, and oriented to face forward of the ECV.

19. A method for operating an electric convenience vehicle (ECV), comprising:
  enabling a user of the ECV to control direction of movement;
  causing at least one wheel to be propelled forward, propelled backward, or to remain in a fixed position in response to the user respectively activating a throttle in a forward position, in a second position, and in an idle position;
  controlling operation of a motor using a command and communications unit;
  enabling the user to communicate over a communications network via the CCU;
  sensing one or more markings positioned on the ground;
  causing the ECV to automatically traverse the one or more markings at a predetermined speed;
  determining distance from an object in front of the ECV;
  causing the ECV to move forward in response to the object moving forward, thereby maintaining a predetermined distance from the object within an area within which the one or markings are located, the object being a person or another ECV.

20. The method according to claim 19, further comprising:
  in response to detecting an object in front of a direction of travel of the ECV using a plurality of sensor, generating sense signals by the sensor indicative of an object being sensed; and
  control movement of the ECV as a function of the sense signals.

21. The method according to claim 20, further comprising:
  displaying operational and non-operational data of the ECV;
  communicating with a communications network; and
  limiting the ECV to a first maximum speed when no objects are detected based on the sense signal, and a second maximum speed when an object is detected based on the sense signal.

22. The method according to claim 21, wherein displaying the operational data includes displaying speed of the ECV, and wherein displaying the non-operational data includes displaying information associated with a venue in which the ECV is operating.

23. The method according to claim 22, wherein displaying the non-operational data includes displaying venue-centric directional information.

24. The method according to claim 21, wherein limiting the ECV to the first maximum speed includes limiting the ECV to a maximum speed that is higher than the second maximum speed.

25. The method according to claim 20, further comprising in response to the user rotating a steering mechanism, sensing for objects in front of an angle of a front face of the steering mechanism.

26. The method according to claim 20, further comprising, responsive to sensing an object, automatically initiating recording of images, and responsive to the object no longer being sensed, automatically initiating stopping recording of images.

27. The method according to claim 20, wherein sensing objects includes sensing objects within a proximity of the ECV.

28. The method according to claim 27, further comprising enabling the user to request directions within the venue.

29. The method according to claim 19, further comprising:
  sensing that the motor is on and that the user transitions from being supported by a user support member to not being supported by the user support member; and
  generating a delay to establish a time period during which a determination as to whether the user is sensed to return being supported by the user support member within the time period before enabling the motor to turn off.

30. The method according to claim 19, further comprising sensing when the user is being supported by a user support member, and further comprising causing the CCU to enter a sleep mode in response to the sensor not sensing that the user is being supported by the user support member, and preventing the CCU from entering the sleep mode in response to sensing that the user is being supported by the user support member.

31. The method according to claim 19, further comprising executing an application that receives signals from a network server, and displaying interactive information received from the network server for the user.

32. The method according to claim 19, further comprising enabling the user to receive information associated with rental of the ECV from a remote device, the information including a unique identifier that enables the user to access operation of the ECV.

33. The method according to claim 19, further comprising enabling the user to rent the ECV directly from the CCU.

34. The method according to claim 33, wherein enabling the user to rent the ECV includes presenting the user interface via which the user can specify duration of rental, submit payment, and submit a unique identifier.

35. The method according to claim 33, further comprising enabling the user to reserve an ECV at a later time.

36. The method according to claim 19, further comprising capturing images of the ECV.

37. The method according to claim 2, wherein said sensors collectively produce a sensing zone being six feet long, thirty inches wide, and eighteen inches high.

38. The ECV according to claim 1, wherein the one or more markings includes paint painted on a ground surface.

39. The method according to claim 19, wherein sensing one or more markings positioned on the ground includes sensing paint painted on a ground surface.

\* \* \* \* \*